(12) United States Patent
Cotner et al.

(10) Patent No.: US 7,716,213 B2
(45) Date of Patent: May 11, 2010

(54) APPARATUS, SYSTEM, AND METHOD FOR EFFICIENTLY SUPPORTING GENERIC SQL DATA MANIPULATION STATEMENTS

(75) Inventors: Curt L. Cotner, Gilroy, CA (US);
Christopher M. Farrar, Los Gatos, CA (US); Robert T. Miller, San Jose, CA (US); Maryela E. Weihrauch, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/740,457

(22) Filed: Apr. 26, 2007

(65) Prior Publication Data

US 2008/0270368 A1 Oct. 30, 2008

(51) Int. Cl.
*G06F 7/00* (2006.01)
(52) U.S. Cl. .................................. 707/718; 707/769
(58) Field of Classification Search .................. None
See application file for complete search history.

(56) References Cited

U.S. PATENT DOCUMENTS

| | | | | |
|---|---|---|---|---|
| 5,875,334 | A | 2/1999 | Chow et al. .................. 395/705 |
| 6,009,271 | A * | 12/1999 | Whatley ..................... 717/127 |
| 6,115,703 | A | 9/2000 | Bireley et al. .................. 707/2 |
| 6,438,559 | B1 | 8/2002 | White et al. ................ 707/103 |
| 6,446,062 | B1 | 9/2002 | Levine et al. .................. 707/3 |
| 6,684,336 | B1 * | 1/2004 | Banks et al. ................ 709/227 |
| 6,965,888 | B1 | 11/2005 | Cesare et al. .................... 70/1 |
| 2003/0051236 | A1 | 3/2003 | Pace et al. .................. 717/177 |
| 2003/0055747 | A1 | 3/2003 | Carr et al. ..................... 705/27 |
| 2003/0167355 | A1 * | 9/2003 | Smith et al. .................. 709/328 |
| 2003/0220941 | A1 | 11/2003 | Arnold et al. .................. 707/20 |
| 2003/0233632 | A1 | 12/2003 | Aigen et al. ................. 717/106 |
| 2004/0073518 | A1 * | 4/2004 | Atkinson et al. .............. 705/65 |
| 2004/0205180 | A1 | 10/2004 | Srivastava et al. ........... 709/223 |
| 2004/0215755 | A1 | 10/2004 | O'Neill ...................... 709/223 |
| 2005/0055336 | A1 * | 3/2005 | Hui et al. ........................ 707/3 |
| 2005/0071346 | A1 * | 3/2005 | Bernal et al. ................. 707/100 |
| 2005/0149940 | A1 * | 7/2005 | Calinescu et al. ........... 718/104 |
| 2005/0262110 | A1 | 11/2005 | Gu et al. ..................... 707/100 |

(Continued)

OTHER PUBLICATIONS

Oracle database programmer's Guide to the Oracle Precompilers 10g Release 2, May 2006.*

(Continued)

*Primary Examiner*—Neveen Abel Jalil
*Assistant Examiner*—Vei-Chung Liang
(74) *Attorney, Agent, or Firm*—Kunzler Needham Massey & Thorpe

(57) ABSTRACT

An apparatus, system, and method are disclosed for efficiently supporting generic SQL data manipulation statements. The method includes determining whether an SQL statement includes extended indicator parameters such as DEFAULT and UNASSIGNED indicators. The method further includes delaying an authorization check for an operation for an SQL statement using extended indicators, and bypassing an SQL exception where an otherwise unauthorized operation involves an UNASSIGNED variable. The method further includes bypassing a database operation such as a referential integrity check where a data change would induce the database operation, but the data change involves an UNASSIGNED variable. The method further includes modifying the SQL statement when the SQL statement involves an UNASSIGNED variable in a predicate clause, allowing the SQL statement to properly execute.

30 Claims, 13 Drawing Sheets

U.S. PATENT DOCUMENTS

2006/0053106 A1\* 3/2006 Bhaghavan et al. ............. 707/4
2006/0053131 A1 3/2006 Meijer et al. ................. 707/101
2007/0088684 A1 4/2007 Chan et al. ..................... 707/4

OTHER PUBLICATIONS

SAP DB Documentation English version, http://sapdb.org/7.4/sap_db_documentation.htm, last updated: Jul. 2003.\*
Lorie Dubois, "A Perfect Fit, what's new in System I Access for Windows", IBM system Magazine, Aug. 2008.\*
Michael Sansoterra, "Treasury of New DB2 6.1 (V6R1) Features, Part 6: Miscellaneous Enhancements", ITJungle, May 6, 2009.\*
IBM, "Improved Remote Procedure Call Facility", IBM Technical Disclosure Bulletin, May 1994, NN9405479.\*
"Information Technology-Data Languages-SQL- Part 2: Foundation (SQL/Foundation)", ISO/IEC JTC 1/SC 32, Jul. 25, 2003, p. 80-83.
"Information Technology-Data Languages-SQL- Part 2: Foundation (SQL/Foundation)", ISO/IEC JTC 1/SC 32, Jul. 25, 2003, p. 91-93.
"Information Technology-Data Languages-SQL- Part 2: Foundation (SQL/Foundation)", ISO/IEC JTC 1/SC 32, Jul. 25, 2003, p. 161-180.
"Information Technology-Data Languages-SQL- Part 2: Foundation (SQL/Foundation)", ISO/IEC JTC 1/SC 32, Jul. 25, 2003, p. 371-416.
"Information Technology-Data Languages-SQL- Part 2: Foundation (SQL/Foundation)", ISO/IEC JTC 1/SC 32, Jul. 25, 2003, p. 807.
"Information Technology-Data Languages-SQL- Part 2: Foundation (SQL/Foundation)", ISO/IEC JTC 1/SC 32, Jul. 25, 2003, p. 822-847.
"New Standard for Stored Procedures in SQL." Eisenberg, A., SIGMOD Record, vol. 25, No. 4, Dec. 1996.
"SQL/CLI-A New Binding Style for SQL" Venkatrao, M. et al., SIGMOD Record, vol. 24, No. 4, Dec. 1995.
Ellis et al, "JDBC™ 3.0 Specification", Final Release, Sun Microsystems, Sections 13 & 15 including 13.2 and 15.2.4, Oct. 2001.
Overpower the PreparedStatement; Java World, Jan. 2002.
Folkert, Nathan, Introduction to JDBC, Spring 2000.
"Information Technology-Data Languages-SQL- Part 1: Framework (SQL/Framework)", ISO/IEC JTC 1/SC 32, Jul. 25, 2003.
Interface PreparedStatement; Java 2 Platform Std. Ed. v1.4.2, 2003.
PreparedStatement interface, c IBM Corporation, 2004.
"Using indicator variables in assembler" UDB for z/OS Version 8, IBM Corporation, Feb 2007. http://publib.boulder.ibm.com/infocenter/dzichelp/v2r2/topic/com.ibm.db2.doc.apsg/indass.htm.
"Fetching Rows with SQLBulkOperations" MSDN, Microsoft Corporation, at least Mar. 2007. http://msdn.microsoft.com/library/defaultasp?url=/library/en-us/odbc/htm/odbcfetching_rows_with_sqlbulkoperations.asp.
"Indicator Values" SAP Library-SAP DB, at least Mar. 2007. http://www.sapdb.orgf7.4/htmhelp/89/470cd41c634401ad7842037a3cd5e9/content.htm.
"ODBC API Reference" Microsoft Open Database Connectivity, at least Mar. 2007. http://msdn.microsoft.com/library/en-us/odbc/htm/odbcodbc_api_reference.asp?frame=true.
"Supporting Database Access in the Hermes Programming Language" Larson, P.A. et al., 1991.
"Transferring DEFAULT Values to the Database Instance" SAP Library- SAP DB, at least Mar. 2007. http://www.sapdb.orgf7.4/htmhelp/e7/e9fac15bbc4a719f7cc7c72d2b2580/content.htm.

\* cited by examiner

Memory cache
218

| Cache entry 302 | SQL statement 110 | Extended indicators 306 | Host variable indicator 224 | Execution plan 304 |
|---|---|---|---|---|
| 0001 | INSERT(ABC) | YES | 000101 | Exec Plan A |
| 0002 | INSERT(ABC) | YES | 000100 | Exec Plan B |
| 0003 | UPDATE(ABC) | YES | 0010 | Exec Plan C |
| 0004 | UPDATE(CDE) | YES | 0000000 | Exec Plan D |
| 0005 | INSERT (XYZ) | YES | 000101 | Exec Plan E |
| 0006 | UPDATE(CDE) | NO | 0000000 | Exec Plan F |

PREPARE

```
>>--PREPARE-statement-name--+------------------------------------------+-->
                            +-ATTRIBUTE-attr-host-variable------+

>--------------FROM-host-variable--><
```

The optional ATTRIBUTES host variable in the above syntax diagram refers to a character string variable that contains a list of prepare statement options. A syntax diagram for the legal content of that character string is the following attribute-string syntax diagram:

attribute-string:

```
      +-------------------------------------------------------------+
      v (1)                                                         |
>>--------+-------+-ASENSITIVE---+------------------------------+--+------------------------><
          |       |-INSENSITIVE--|                              |
          |       |-SENSITIVE----|                              |
          |                                                     |
          +-------+-NO SCROLL---+------------------------------+
          |       +-SCROLL--------+                             |
          +-------+-WITHOUT HOLD-+-------------------------+
          |       +-WITH HOLD-------+                          |
          |                                                     |
          +-------+-WITHOUT RETURN--+----------------------+
          |       +-WITH RETURN--------+                       |
          |                                                     |
          +-------+-WITHOUT RETURN--+----------------------+
          |       +-WITH RETURN--------+                       |
          |                                                     |
          +-------+-WITHOUT EXTENDED INDICATORS-+--+
                  +-WITH EXTENDED INDICATORS-------+
```

Notes:
  1. Each clause may be specified only once. If the options are not specified, their defaults are whatever was specified for the corresponding options in the associated statement.

Description
...
    ATTRIBUTES *attr-host-variable*
      Specifies the attributes
        ...

WITHOUT EXTENDED INDICATORS or WITH EXTENDED INDICATORS
        Specifies whether the values provided for indicator variables during executing of the statement follow standard SQL semantics for indicating NULL values, or may use extended capabilities to indicate a DEFAULT or UNASSIGNED value

DECLARE CURSOR

```
>>-DECLARE-cursor-name-CURSOR---+------------------------------------------------+-->
                                |                                          (1)   |
                                | +----------------------------------------+     |
                                | v                                              |
                                +-----+-+--WITHOUT HOLD--+----------------------+---+--+
                                        | +--WITH HOLD--------+                 |
                                        |                                       |
                                        +---+-WITHOUT RETURN-+------------------+
                                        |   +--WITH RETURN------+           (2) |
                                        +---+-WITHOUT EXTENDED INDICATORS--+
                                            +-WITH EXTENDED INDICATORS--------+

>--------------FOR-+-select-statement-+------------------><
                   +-statement-name-+
```

Notes:
1. The same clause must not be specified more than once.
2. The default of WITHOUT EXTENDED INDICATORS only applies when select-statement is specified

Description
...
> WITHOUT EXTENDING INDICATORS or WITH EXTENDED INDICATORS
> Specifies whether extended indicator variables are enabled.
>
>> WITHOUT EXTENDED INDICATORS Specifies that extended indicator variables are disabled, and only updatable columns are allowed in the implicit or explicit UPDATE clause of the *select-statement*
>>
>> WITH EXTENDED INDICATORS Specifies that extended indicator variables are enabled, and non-updatable columns are allowed in the implicit or explicit UPDATE clause of the *select-statement*

```
CREATE TABLE EMPLOYEE (
        EMPNO INTEGER NOT NULL,
        FIRSTNM VARCHAR (21) NOT NULL,
        LASTNAME VARCHAR (25) NOT NULL,
        WORKDEPT INTEGER,
        PHONENO INTEGER,
        JOBCODE CHAR (8),
        SALARY DECIMAL (9,2),
        PRIMARY KEY (EMPNO) ) ;

INT EMPNOval;
    CHAR [22] FNAMEval;
    CHAR [26] LNAMEval;
    INT WDEPTval;
    INT PHONEval;
    CHAR [9] JCODEval;
    DECIMAL SALval;
    SHORT EMPNOind, FNAMEind, LNAMEind, WDEPTind, PHONEind,
        JCODEind, SALind = INASSIGNED;
    CHAR [50] stringINSRT, stringATTRIB;

stringINSRT = "INSRT INTO EMPLOYEE VALUES (?,?,?,?,?,?,?)";
stringATTRIB = "WITH EXTENDED INDICATORS";
EXEC SQL PREPARE stmtINSRT ATTRIBUTES :stringATTRIB
    FROM :stringINSRT;                                          110
602

EXEC SQL EXECUTE stmtINSRT USING  :EMPNOval  :EMPNOind,
    :FNAMEval   :FNAMEind,  :LNAMEval  :LNAMEind,  :WDEPTval :WDEPTind,
    :PHONEval   :PHONEind,  :JCODEval  :JCODEind,  :SALval   :SALind;
                          604
```

```
CHAR [160] stringUPD;
stringUPD =
   "UPDATE EMPLOYEE SET EMPNO = ?, FIRSTNME = ?, LASTNAME = ?,
WORKDEPT = ?, PHONENO = ?, JOBCODE= ?, SALARY = ? WHERE
CURRENT OF myCURSE";

EXEC SQL DECLARE myCURSE CURSOR WITH EXTENDED INDICATORS
FOR SELECT * FROM EMPLOYEE FOR UPDATE;

EXEC SQL PREPARE stmtUPDT FROM :stringUPD;          ~110
                 602

EXEC SQL OPEN myCURSE;

EXEC SQL EXECUTE stmtUPDT USING :EMPNOval  :EMPNOind,
     :FNAMEval  :FNAMEind,  :LNAMEval  :LNAMEind,  :WDEPTval  :WDEPTind,
     :PHONEval  :PHONEind,  :JCODEval  :JCODEind,  :SALval  :SALind;
                          604
```

Fig. 6B

APPARATUS, SYSTEM, AND METHOD FOR EFFICIENTLY SUPPORTING GENERIC SQL DATA MANIPULATION STATEMENTS

CROSS-REFERENCES TO RELATED APPLICATIONS

This application is related to patent application Ser. No. 11/249,217 entitled "PARTIAL UPDATING IN A DATABASE PROXY DRIVER" and filed on Oct. 13, 2005 for Chan, et al.

BACKGROUND OF THE INVENTION

1. Field of the Invention

This invention relates to structured query language (SQL) enhancements, and more particularly relates to efficiently supporting generic SQL data manipulation statements.

2. Description of the Related Art

Updating and inserting data records into a database is a common data operation. Often, a user will update many data records with a common set of data fields, or columns, but not every field will be updated on every data record, and not every field will have information on a data insertion. For example, a database operator may make an annual update an employee records database. During the annual update, the operator may update 95% of the employee years-of-service values, 90% of the employee salary values, 50% of the employee benefit selections, 20% of the employee job titles, 10% of the employee work addresses, and 3% of the employee name fields. Additionally, the operator may insert new employee records into the database, and the new employees may not have information available for all fields at the time of the annual update. Most database applications utilize the SQL standard as the high level language for controlling database manipulations. For the annual update in the example, the majority of data records have a few changes, but the fields in which the changes occur for each data record vary widely.

Currently available SQL implementations do not efficiently support a generic SQL statement for a circumstance like the example where the field to be updated varies from record to record. A generic SQL statement is a statement referencing all of the data columns that may experience a change when the SQL statement is executed, and/or a statement referencing all of the data columns that may be involved in a selection criteria (i.e. a predicate) for selecting records to be manipulated. However, a given data record update or insertion may actually have information available for only some of the data columns—for example only a change to the years-of-service and salary values, for all of the data columns, or even for none of the data columns. Currently available SQL implementations do not efficiently support running an update operation to a data record, where no data is supplied for one or more columns of the update. Likewise, currently available SQL implementations do not efficiently support selecting data records based upon criteria, where no data is supplied for one or more columns of the selection criteria.

There are currently two approaches for handling generic SQL statements in situations like the example presented above. In a first approach, a client application captures the generic SQL statement, and provides a previous value for any data that is not available. This approach works, but imposes significant overhead on the system. For example, if the employee name is not provided in the example annual update, the client application has to retrieve the employee name from the database and send the employee name back to the database when the SQL statement is executed. The database management system has to check if the current user is authorized to write to the employee name field, run any referential integrity checks and/or triggered actions based on a write action to the employee name field, and then write the value of the employee name back over the previous value. This method imposes a significant network and processor overhead.

In the second approach, the client application creates a specific SQL statement that writes to only the data columns where information is available for a particular data record. In the example, there are six data columns, and potentially sixty-four (i.e. $2^6$) different possibilities of specific SQL statements depending upon how many different combinations of data columns will be written to for the data records. Therefore, the system must have a large memory area available for caching execution plans for the SQL statements, or the system must not cache execution plans and just create a new execution plan for each data record. Whether the system utilizes a large memory cache or creates a new execution plan for each data record, the second approach imposes a significant burden on the system, and causes degraded performance of the database operations.

Even where the burdens of supporting generic SQL statements for the example are overcome, an additional complication is imposed by selection predicates with generic SQL statements where a data record on the client application does not provide some of the selection data, and where absence of that data indicates that its related predicate is to be ignored. In the example, an SQL statement may select only employee records where the years of service are greater than a given value (e.g. in an SQL WHERE clause), but a given data record on the client application may not provide a years of service value, which in this example indicates that all employee records are to be selected. There are no methods in the current technology to manage selection predicates with a generic SQL statement where some of the data records on a client application do not supply values to use in the predicate.

SUMMARY OF THE INVENTION

From the foregoing discussion, Applicant asserts that a need exists for an apparatus, system, and method that efficiently supports generic SQL data manipulation statements. Beneficially, such an apparatus, system, and method would reduce the processing and memory overhead for supporting generic SQL statements, and further support the use of generic SQL statements with selection predicates where some of the selection criteria may not be available in a given data record.

The present invention has been developed in response to the present state of the art, and in particular, in response to the problems and needs in the art that have not yet been fully solved by currently available database management systems and SQL implementations. Accordingly, the present invention has been developed to provide an apparatus, system, and method for efficiently supporting generic SQL data manipulation statements that overcome many or all of the above-discussed shortcomings in the art.

An apparatus is disclosed for efficiently supporting generic SQL data manipulation statements. The apparatus includes a plurality of modules for functionally executing the generic SQL statement support. The apparatus includes an SQL input module, an extended indicator module, and an optimization module. The apparatus may further include an SQL exception handling module, an authorization module, a database operations module, and a predicate handling module.

The SQL input module interprets an SQL statement from a client application. The extended indicator module determines whether the SQL statement includes extended indicator parameters. In one embodiment, the extended indicator parameters include an indicator parameter having a specific value indicating that a related host variable should be treated as one of NULL, NOT_NULL, DEFAULT, UNASSIGNED, and/or a defined system variable.

The optimization module prepares an SQL execution plan based on the SQL statement and each extended indicator parameter. In one embodiment, the exception handling module generates an SQL exception if the SQL statement includes a complex expression involving a host variable, and/or generates an SQL exception if the SQL statement includes an expression involving a host variable passed to a routine. In one embodiment, the exception handling module generates an SQL exception if the routine supports only input values that are not NULL, but the expression involving the host variable(s) includes a host variable treated as other than NOT_NULL.

In one embodiment, the SQL statement includes an insert, update, select, and/or merge operation, and the authorization module determines a host variable value for a target column of a DBMS object, and bypasses an authorization check for the operation if the host variable value is treated as UNASSIGNED. The authorization check is at least one of an update authorization, select authorization, insert authorization, updateability, and insertability.

In one embodiment, the optimization module prepares the SQL execution plan for the SQL statement such that when a host variable for a data column is treated as UNASSIGNED, the SQL execution plan does not provide a value for writing to the data column. In one embodiment, the optimization module prepares the SQL execution plan for the SQL statement such that when a host variable for a data column is treated as DEFAULT, the SQL execution plan writes a default value to the data column. In one embodiment, the optimization module prepares the SQL execution plan for the SQL statement such that when a host variable for a data column is treated as a defined system variable, the SQL execution plan writes the defined system variable to the data column.

The database operations module performs a database operation that may be a referential integrity check, an index maintenance, a materialized query maintenance, a pre-computed aggregate update, and/or a triggered action for the target column of the DBMS object. In one embodiment, the database operations module defers a database operation when an update operation to a target column of the DBMS object would trigger the database operation until the host variable for the target column of the DBMS object is determined, and bypasses the database operation when the update involves a host variable value treated as UNASSIGNED. In one embodiment, the database operation involves multiple data columns, and the database operations module bypasses the database operation when each column that would trigger the database operation is being updated with host variable values treated as UNASSIGNED.

In one embodiment, the SQL statement allows extended indicator parameters and includes at least one predicate clause involving an indicator parameter. The predicate handling module may check whether any indicator parameter in the predicate clause has a value of UNASSIGNED, re-write the SQL statement using a standard convention, and check whether a memory cache has an SQL statement equivalent to the re-written SQL statement. The optimization module may utilize an execution plan stored with the equivalent SQL statement if available, or optimize an execution plan based on the re-written SQL statement, store the optimized plan, and use the optimized plan as the SQL execution plan.

In one embodiment, the SQL statement allows extended indicator parameters and includes at least one predicate clause involving an indicator parameter. The predicate handling module may check whether any indicator parameter in the predicate clause has a specific value indicating UNASSIGNED, generate a host variable indicator based on the indicator parameters having specific values indicating UNASSIGNED, and check whether a memory cache has a stored SQL statement and host variable indicator equivalent to the SQL statement and host variable indicator from the SQL input module. The optimization module may utilize an execution plan stored with the equivalent SQL statement if available, or optimize an execution plan based on the SQL statement and a standard convention, store the optimized plan, and use the optimized plan as the SQL execution plan.

In one embodiment, the SQL statement allows extended indicator parameters and includes at least one predicate clause involving an indicator parameter. The predicate handling module may check whether any indicator parameter in the predicate clause has a specific value indicating UNASSIGNED. The optimization module may optimize an execution plan based on the SQL statement, the values of each host variable, and a standard convention, and utilize the optimized plan as the SQL execution plan.

A method is disclosed for efficiently supporting generic SQL data manipulation statements. The method includes interpreting an SQL statement from a client application and determining whether the SQL statement includes extended indicator parameters. The method further includes preparing an execution plan based on the SQL statement and each indicator parameter.

In one embodiment, the SQL statement does not include extended indicator parameters, and the method further includes treating a host variable related to a negative indicator parameter as a NULL host variable, and treating a host variable related to an non-negative indicator parameter as a NOT_NULL host variable. The method may include generating an SQL exception if a complex expression involves a host variable that is treated as UNASSIGNED and/or DEFAULT. In one embodiment, the SQL statement includes an expression involving a host variable passed to a routine, and the method includes generating an SQL exception if the routine supports only NOT_NULL host variables, but the expression involving the host variable(s) includes a host variable treated as a value other than NOT_NULL.

In one embodiment, the method includes deferring checking the insert authorization and the insertability for the target column of the DBMS object until the host variable value for each data column of the DBMS object is determined, where the SQL statement allows extended indicator parameters and includes an insert operation directed to a target column of a DBMS object. The method may further include bypassing an SQL exception when a data column is unauthorized for at least one of insert access and insertability, but the data column has a host variable treated as UNASSIGNED.

In one embodiment, the SQL statement allows extended indicator parameters and includes an update operation directed to a target column of a DBMS object, and the method further includes deferring checking the update authorization and the updateability for the target column of the DBMS object until the host variable value for each data column of the DBMS object is determined. The method may further include bypassing an SQL exception when a data column is unauthorized for at least one of update access and updateability, but the data column has a host variable treated as UNASSIGNED.

In one embodiment, the SQL statement allows extended indicator parameters and includes a merge operation directed to a target column of a DBMS object, and the method further includes deferring checking the insert authorization, the update authorization, the updateability, and the insertability for the target column of the DBMS object until the host variable value for each data column of the DBMS object is determined. The method may further include bypassing an SQL exception when a data column is unauthorized for at least one of insert access, update access, updateability, and insertability, but the data column has a host variable treated as UNASSIGNED.

In one embodiment, the SQL statement includes extended indicator parameters and an update operation directed to a target column of a DBMS object. The method may further include triggering a database operation when an update occurs to the target column of the DBMS object, unless the target column has a host variable value treated as UNASSIGNED. The database operation may be a referential integrity check, an index maintenance, a triggered action, a materialized query maintenance, and/or a pre-computed aggregate update. In one embodiment, the SQL statement includes update operations to multiple target columns of the DBMS object, and the method includes triggering a database operation when an update occurs to any of the target columns unless the host variable for each of the target columns has a host variable value treated as UNASSIGNED.

The method may include predicate handling steps when the SQL statement includes a predicate clause involving extended indicator parameters. The predicate handling steps may include re-writing the SQL statement according to a standard convention, and/or generating a host variable indicator denoting which host variables in the predicate clause are treated as UNASSIGNED and saving the SQL statement with the host variable indicator in a memory cache. In one embodiment, the predicate handling steps include optimizing an execution plan based on the SQL statement, the values of each host variable, and a standardized convention.

In one embodiment, the SQL statement includes a predicate clause involving extended indicator parameters and further includes multiple rows of host variables. The method may further include generating an SQL exception and/or generating an SQL exception if, within any column of host variables in a predicate clause, some host variables are treated as UNASSIGNED and some host variables are not treated as UNASSIGNED.

A system is disclosed for efficiently supporting generic SQL data manipulation statements. The system includes a server hosting a database management system (DBMS), a client application, and a network connecting the server and the client application. The DBMS includes a plurality of modules configured to functionally execute efficiently supporting generic SQL data manipulation statements. The DBMS includes an SQL input module, an extended indicator module, and an optimization module. The DBMS may further include an authorization module, a predicate handling module, and a data operations module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a schematic illustration of one embodiment of a memory cache in accordance with the present invention;

FIG. 4 is an illustration of one embodiment of a PREPARE syntax diagram in accordance with the present invention;

FIG. 5 is an illustration of one embodiment of a DECLARE CURSOR statement syntax diagram in accordance with the present invention;

FIG. 6A is an illustration of one embodiment of a pseudo-code generic SQL statement allowing indicator parameters used in an insert operation in accordance with the present invention;

FIG. 6B is an illustration of one embodiment of a pseudo-code generic SQL statement allowing indicator parameters used in an update operation in accordance with the present invention;

DETAILED DESCRIPTION OF THE INVENTION

Figure 1:
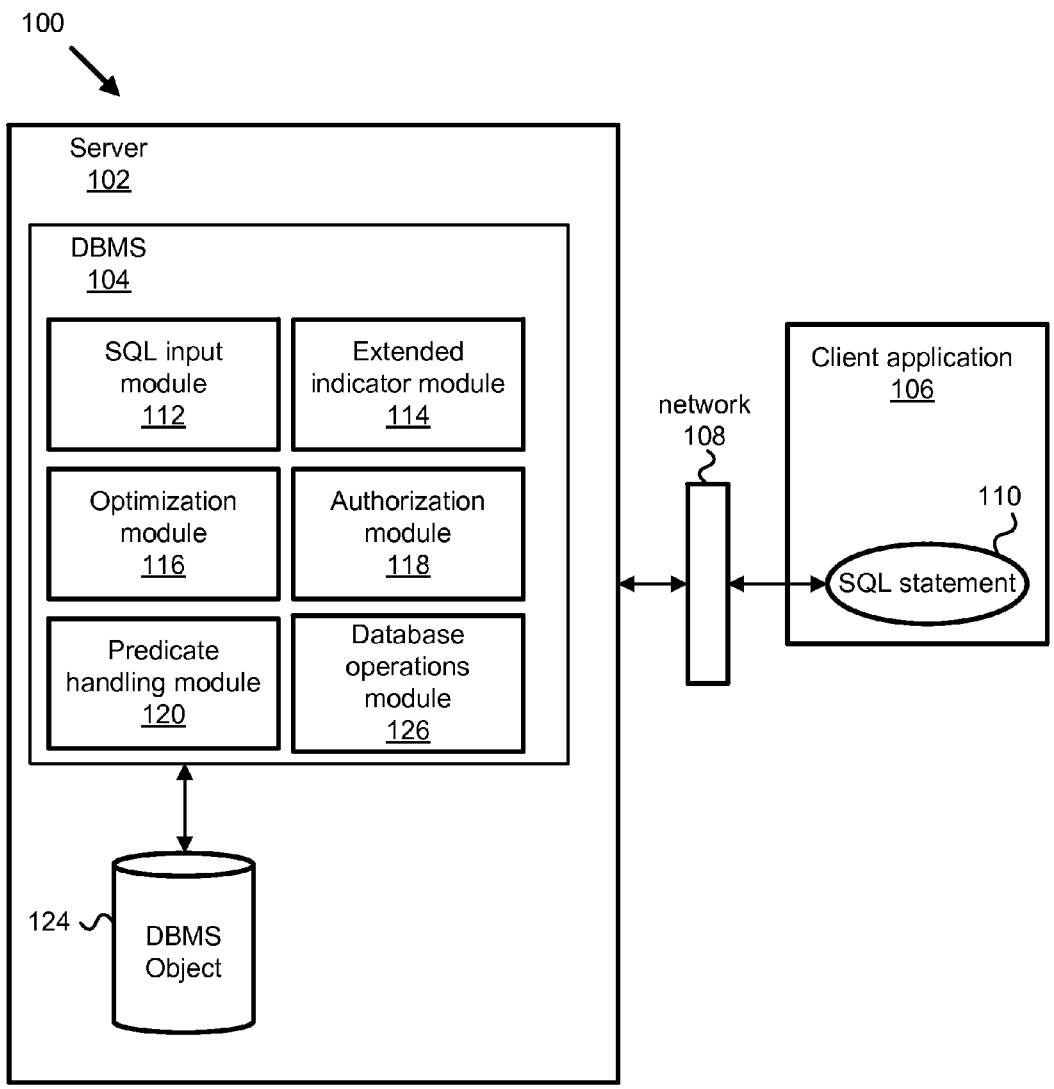
FIG. 1 is a schematic block diagram illustrating one embodiment of a system for efficiently supporting generic SQL data manipulation statements in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Any modules implemented as software for execution are implemented as a computer readable program on a computer readable medium and are thereby embodied in a tangible medium.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a system 100 for efficiently supporting generic SQL data manipulation statements in accordance with the present invention. As used herein, a generic SQL data manipulation statement refers to an SQL statement, where the SQL statement references all of the data columns that may experience a change (e.g. INSERT, UPDATE, and/or MERGE statements) when the SQL statement is executed, and/or includes all the predicates (e.g. data columns in WHERE clauses) that may be used in qualifying rows for processing. The system 100 includes a server 102 hosting a database management system (DBMS) 104. The server 102 may be any computer hardware and operating system known in the art. The DBMS 104 may be any database management application known in the art, for example IBM DB2®, Oracle® DBMS, Microsoft® SQL Server™, and the like.

The system 100 further includes a client application 106, and a network 108 connecting the server 102 and the client application 106. The network 108 may be an internet connection, an intranet connection, a local area connection (LAN), and/or any other connection mechanism between a computer running the client application 106 and the server 102. In one embodiment, the server 102 and client application 106 are contained on a single computer (not shown), and the network 108 comprises internal communications within the computer.

The DBMS 104 includes a plurality of modules configured to functionally execute efficiently supporting generic SQL data manipulation statements 110. The DBMS 104 includes an SQL input module 112, an extended indicator module 114, and an optimization module 116. In one embodiment, the DBMS 104 further includes an authorization module 118, a predicate handling module 120, and/or a database operations module 126. The system 100 further includes at least one DBMS object 124, which may be a DBMS data element—for example a Table or View.

Figure 2:
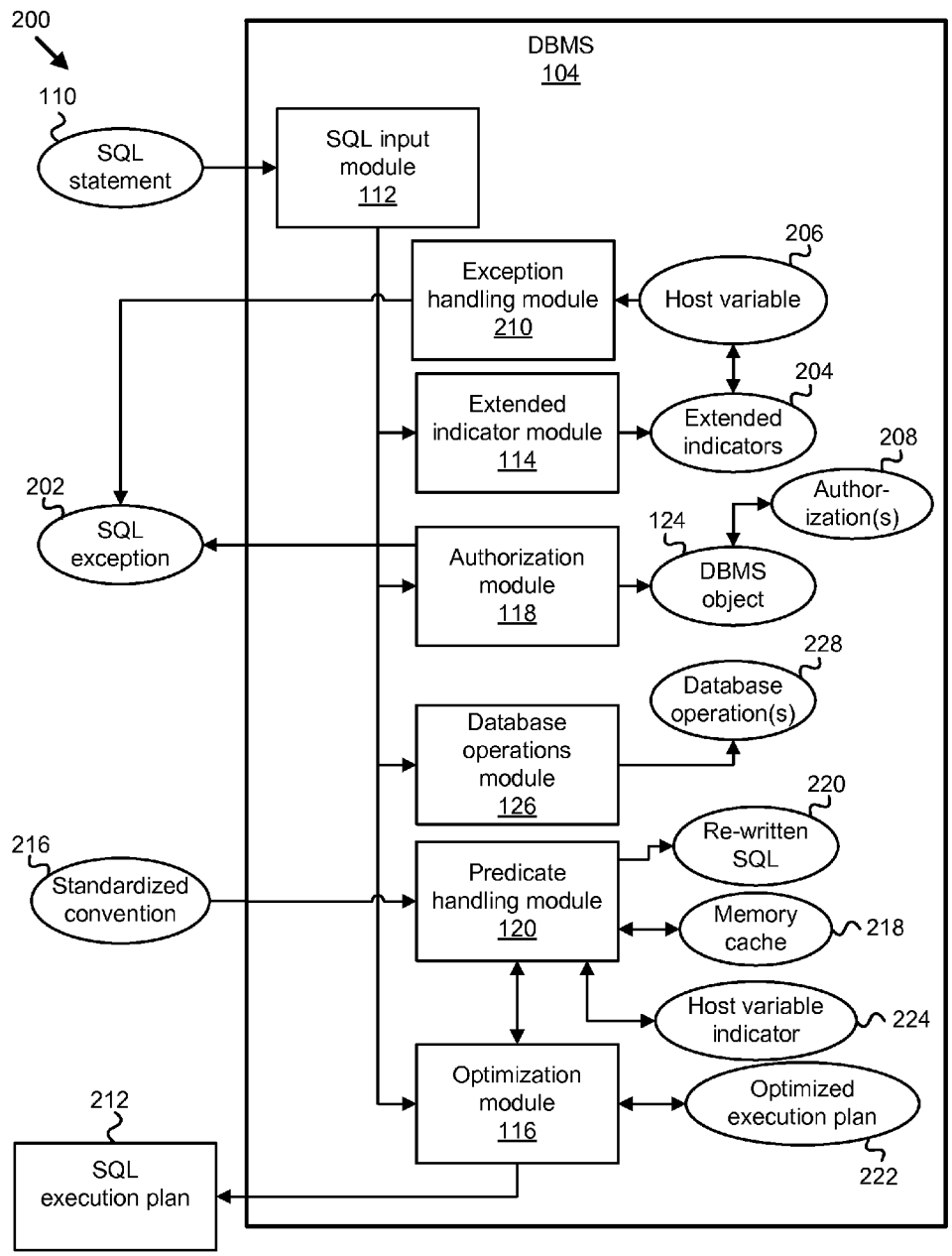
FIG. 2 is a schematic block diagram illustrating one embodiment of an apparatus for efficiently supporting generic SQL data manipulation statements in accordance with the present invention.

FIG. 2 is a schematic block diagram illustrating one embodiment of an apparatus 200 for efficiently supporting generic SQL data manipulation statements 110 in accordance with the present invention. The apparatus 200 may be implemented on a DBMS 104. The DBMS 104 includes an SQL input module 112 that interprets an SQL statement 110 from a client application 106. The SQL statement 110 may be created by any SQL-supporting software known in the art, for example JAVA, C, C++, COBOL, and the like. In one embodiment, the SQL input module 112 checks the syntax of the SQL statement 110, and generates an SQL exception 202 if the SQL statement 110 contains errors, unparseable syntax, and/or the like.

The DBMS 104 further includes an extended indicator module 114 that determines whether the SQL statement 110 includes extended indicator parameters 204. In one embodiment, an SQL statement 110 may include extended indicator parameters 204 by including specific syntax such as "WITH EXTENDED INDICATORS" at a specified location within the SQL statement 110. The determination of specific methods and/or syntax to indicate the inclusion of extended indicator parameters 204 in a given embodiment of the apparatus 200 is a mechanical step for one of skill in the art, and any known method is contemplated within the scope of the present invention.

Indicator parameters 204 are used in the current art to enable the client application 106 and the DBMS 104 to exchange information regarding NULL values. For example, an indicator parameter value that is negative indicates, in the current art, that a related host variable is treated as NULL. Further, in the current art, an indicator parameter value that is non-negative (i.e. "0" or positive) indicates that a related host variable value is to be used, to be treated as being NOT_NULL, and specifically as having the value of the related host variable.

In one embodiment of the present invention, extended indicator parameters 204 include an indicator parameter having a specific value indicating that a related host variable 206 should be treated as NULL, NOT_NULL, or UNASSIGNED. In one embodiment, extended indicator parameters 204 further include specific values indicating that a related host variable 206 be treated as DEFAULT or as a defined system variable. For example, an SQL statement 110 may include extended indicator parameters, and indicator parameter 204 values of −2, −4, −8, −16, −32, and −64 may indicate that a related host variable 206 is to be treated as (respectively) NULL, NOT_NULL, UNASSIGNED, DEFAULT, SYSTEM_TIME (a defined system variable), and CURRENT_USER (a second defined system variable). In one embodiment, the extended indicator module 114 may determine that an SQL statement 110 does not include extended indicator parameters 204, and may indicate to the DBMS 104 that a negative indicator parameter indicates that the related host variable value should be treated as NULL (and the related host variable's value should be ignored), and that a non-negative indicator parameter indicates that the related host variable value should be treated as NOT_NULL and the related host variable's value should be utilized.

The present invention is independent of the numerical mapping of specific values to specific indicator parameter usages, and the example numbers are provided for illustration only. In one embodiment, ranges may also be applied—for example any value that is non-negative may be treated as a NOT_NULL. The selection of defined system variables is a mechanical step for one of skill in the art, and any system variable known to the DBMS 104 at run-time is available as a defined system variable. For example, a DBMS 104 may have a list of defined system variables in the documentation for the DBMS 104 along with a list of indicator parameter values 204 that access each defined system variable.

In one embodiment, the SQL statement 110 includes extended indicator parameters 204 and the SQL statement 110 includes an insert, update, select, and/or merge operation directed to a target column of the DBMS object 124. The apparatus 200 may further comprise an authorization module 118 configured to determine the host variable value 206 for the target column of the DBMS object 124, and to bypass an authorization 208 check when the host variable value 206 for the target column is treated as UNASSIGNED. As used herein, the host variable value 206 (or the value the host variable 206 is treated as) for the target column of the DBMS object 124 may be the value used to insert, update, select, and/or merge for the column. For example, if the operation is a select, the host variable value 206 is the value compared to the target column in a predicate. If the operation is an insert, the host variable value 206 is the value assigned to the column when the insert operation is executed.

As used herein, a merge operation may comprise an operation to update a column to a specified value if an identified data record of the DBMS object 124 exists, and to insert to the column with the specified value if the identified data record of the DBMS object 124 does not already exist. The authorizations 208 may be any type of authorizing access for the SQL statement 110 known in the art. For example, the authorization 208 may be one or more of an insert authorization, update authorization, and/or select authorization. Additionally, the authorization 208 may include checks for insertability and/or updateability, including checking whether a column is calculated and does not accept values from an insert or update operation.

In one embodiment, the SQL statement 110 includes extended indicator parameters 204 and includes an insert operation directed to a target column of a DBMS object 124. The authorization module 118 may defer checking an insert authorization 208 and an insertability 208 for the target column of the DBMS object 124 until the host variable 206 value for the target column of the DBMS object 124 is determined, and bypass an SQL exception 202 when: a data column is unauthorized for at least one of insert access 208 and insertability 208, but the data column has a host variable 206 treated as UNASSIGNED.

In one embodiment, the SQL statement 110 includes extended indicator parameters 204 and includes one of an insert, update, select, and merge operation directed to a target column of a DBMS object 124. The authorization module 118 may defer checking an authorization 208 until the host variable 206 value assigned to and/or compared with the target column of the DBMS object 124 is determined, and bypass the authorization 208 check when the target column has a host variable 206 treated as UNASSIGNED.

The authorization module 118 may also bypass an SQL exception 202 when a data column is not authorized for an access type, but the host variable value 206 related to that data column is treated as UNASSIGNED. The authorization module 118 may bypass an SQL exception 202 by skipping the checking of the authorizations 208 after determining a host variable value 206 is treated as UNASSIGNED, and/or by checking the authorization 208, but bypassing the setting of an SQL exception 202 if the authorization 208 for a given command is lacking but the host variable value 206 is treated as UNASSIGNED.

In another example, the SQL statement 110 may access the column EMPLOYEE_SALARY of the table EMPLOYEE_RECORDS, but the SQL statement 110 may have an indicator parameter 204 and host variable 206 related to the EMPLOYEE_SALARY column. The authorization module 118 may defer checking the authorization(s) 208 related to the EMPLOYEE_SALARY column in the example until the host variable value 206 is known. The authorization module 118 may bypass the authorization 208 check in the example if the host variable value 206 for the EMPLOYEE_SALARY column of the table EMPLOYEE_RECORDS is treated as UNASSIGNED. As used herein, UNASSIGNED indicates that no value is being compared to the target data column, although other terms and/or syntax than UNASSIGNED may be used for this concept. In the example, because the value compared with the EMPLOYEE_SALARY column is UNASSIGNED—i.e. that no value is actually supplied for the predicate, the authorization module 118 increases efficiency by bypassing the authorization 208 check because the select access is not needed for the present operation, while allowing the authorization 208 check to occur on a subsequent operation when a value may be supplied for the predicate.

Continuing the example with the EMPLOYEE_RECORDS table, the SQL statement 110 may have a command to update the EMPLOYEE_SALARY data column of the EMPLOYEE_RECORDS table, but the current user may not have update access to that data column. However, the indicator parameter 204 related to the EMPLOYEE_SALARY data column in the SQL statement 110 may have a specific value indicating that the host variable 206 is to be treated as UNASSIGNED, and the authorization module 118 may bypass the SQL exception 202 and allow the SQL statement 110 to be executed because the current user is not actually updating the EMPLOYEE_SALARY data column, but rather is not assigning any value to the EMPLOYEE_SALARY data column. As used herein, UNASSIGNED indicates that no value is being provided for updating the target data column, although other terms and/or syntax than UNASSIGNED may be used for this concept.

The apparatus 200 may include an exception handling module 210 that generates an SQL exception 202 when the SQL statement 110 includes a complex expression involving a host variable 206 treated as UNASSIGNED and/or DEFAULT. A complex expression is any expression that includes more terms than just a lone host variable 206 and its associated indicator parameter 204 used a single time. For example, a host variable expression of "HOST+5" (probably ":HOST:HOSTind+5" in standard syntax) with an indicator parameter 204 indicating that the HOST variable 206 should be treated as UNASSIGNED is a complex expression that yields a nominal result of "UNASSIGNED+5." The exception handling module 210 may generate an SQL exception 202 and abort the execution of the SQL statement 110 in the example.

In one embodiment, the SQL statement 110 includes an expression involving a host variable 206 passed to a routine—for example a user-defined function (UDF) and/or procedure call. In a further embodiment, the exception handling module 210 generates an SQL exception 202 if the SQL statement 110 includes an expression involving a host variable 206 passed to a routine—for example a user-defined function (UDF) and/or procedure call. In one embodiment, the exception handling module 210 checks whether the routine supports only host variables 206 with an indicator parameter 204 indicating that the host variable 206 is to be treated as NOT_NULL, and generates an SQL exception 202 condition if the SQL statement 110 includes an expression passed to a routine involving a host variable treated as a value other than NOT_NULL.

The DBMS 104 further includes an optimization module 116 that prepares an SQL execution plan 212 for the SQL statement 110 based on the SQL statement 110 and each extended indicator parameter 204. The SQL execution plan 212 comprises various steps taken by the DBMS 104 in servicing the SQL statement 110, and may include some steps that ordinarily occur in a PREPARE step, and/or some steps that ordinarily occur in an EXECUTE step. The optimization module 116 may prepare the SQL execution plan 212 as part of a PREPARE and/or EXECUTE step. In one embodiment, steps performed by other modules on the DBMS 104 may be part of the SQL execution plan 212. For example, the authorization 208 checks performed by the authorization module 118 may be performed as a part of the SQL execution plan 212.

Bypassing authorization 208 checks, and/or bypassing the setting of an SQL exception 202 can be managed in at least two ways. In a first method, the authorization 208 checks are done in an EXECUTE step similar to those ordinarily done in the PREPARE step. For example, if a user trying to update the employee_salary with a host variable value treated as other than UNASSIGNED is "SMITTY," then the EXECUTE step includes checking whether SMITTY has UPDATE authorization 208 for employee_salary. In a second method, the authorization 208 checks are done in a PREPARE step, but the PREPARE step does not report an SQL exception 202 if the authorization 208 check indicates that SMITTY is not authorized. In the second method, the EXECUTE step receives the result of the authorization check, and sets the SQL exception 202 if the host variable value assigned to employee_salary turns out to be treated as anything other than UNASSIGNED. Any of these methods of implementing the deferred authorization, and any other methods apparent to one of skill in the art based on the disclosures herein, are included within the scope of the present invention.

In one embodiment, the optimization module prepares the SQL execution plan 212 such that when a host variable 206 for a data column is treated as UNASSIGNED, the SQL execution plan 212 does not provide a value for writing to the data column. In one embodiment, the optimization module prepares the SQL exception plan 212 such that when a host variable 206 for a data column is treated as DEFAULT, the SQL execution plan 212 writes a default value to the data column. In one embodiment, the optimization module prepares the SQL exception plan 212 such that when a host variable 206 for a data column is treated as a defined system variable, the SQL execution plan 212 writes the defined system variable to the data column. In one embodiment, the optimization module prepares the SQL execution plan such that when a host variable 206 for a data column is treated as DEFAULT, the SQL execution plan selects a data row having the data column if the data column has a value that is the default value.

For example, the SQL execution plan 212 may bypass an UPDATE operation to a data column when the host variable 206 for the data column is treated as UNASSIGNED. In another example, the SQL execution plan 212 may INSERT a row into a DBMS object 124 on an INSERT command, and provide the column's default value when the host variable 206 for the data column is treated as UNASSIGNED.

In one example, an SQL statement 110 updates a data record (e.g. EMPLOYEE_SALARY_dbms column of EMPLOYEE_RECORD_dbms) in the DBMS object 124 with a data record on the client application 106 side (e.g. EMPLOYEE_SALARY_cs column of EMPLOYEE_RECORD_cs), and the data column EMPLOYEE_SALARY_cs has an indicator parameter 204 indicating that EMPLOYEE_SALARY_cs is treated as UNASSIGNED. In the example, the optimization module 116 prepares the SQL execution plan 212 such that the SQL execution plan 212 does not provide a value for a write operation to EMPLOYEE_SALARY_dbms.

In one embodiment, the SQL statement 110 includes a predicate clause involving at least one indicator parameter 204. The apparatus 200 may include a predicate handling module 120 that checks whether any indicator parameter 204 within a predicate clause has a value indicating that a related host variable 206 is treated as UNASSIGNED. In one embodiment, the predicate handling module 120 re-writes the SQL statement 110 based on the predicate clause and a standard convention 216, and checks whether a memory cache 218 contains a matching entry for the re-written SQL statement 220. If the memory cache 218 contains a matching entry for the re-written SQL statement 220, the optimization module 116 utilizes a stored execution plan from the memory cache 218 as the SQL execution plan 212. If the memory cache 218 does not contain a matching entry for the re-written SQL statement 220, the optimization module 116 develops an optimized execution plan 222 based on the re-written SQL statement 220, stores the optimized execution plan 222, and utilizes the optimized execution plan 222 as the SQL execution plan 212.

In one embodiment, the SQL statement 110 includes a predicate clause involving at least one indicator parameter 204. The predicate handling module 120 checks the values of each indicator parameter 204 involved with the predicate clause to determine the values of each host variable 206. The optimization module 116 develops an optimized execution plan 222 based on the SQL statement 110, the value of each host variable 206, and a standardized convention, and utilizes the optimized execution plan 222 as the SQL execution plan 212. The optimization module 116 may optimize the execution plan 222 based on the values of host variables 206 involved with the predicate clause, or based on the values of all host variables 206 in the SQL statement 110.

In one embodiment, the SQL statement 110 includes a predicate clause involving at least one indicator parameter 204. The predicate handling module 120 determines a host variable indicator 224 based on each indicator parameter 204 indicating that a related host variable 206 is treated as UNASSIGNED. The predicate handling module 120 further checks whether a memory cache 218 contains a matching entry for the SQL statement 110 and the host variable indicator 224. If the memory cache 218 contains a matching entry for the SQL statement 110 and the host variable indicator 224, the optimization module 116 utilizes a stored data manipulation plan from the memory cache 218 as the SQL execution plan 212. If the memory cache 218 does not contain a matching entry for the SQL statement 110 and the host variable indicator 224, the optimization module 116 develops an optimized execution plan 222 based on the SQL statement 110, the host variable indicator 224 and a standardized convention, stores the optimized execution plan 222, and utilizes the optimized execution plan 222 as the SQL execution plan 212.

The host variable indicator 224 is a description of the host variable values 206 that are treated as UNASSIGNED or not UNASSIGNED. For example, the host variable indicator 224 may be a bit sequence like "001001" which in one embodiment may indicate that there are seven extended indicator parameters 204 in an SQL statement 110, and that the third and seventh indicator parameters 204 have an associated host variable value 206 treated as UNASSIGNED. Other conventions for storing the information within a host variable indicator 224 are understood by one of skill in the art and are contemplated within the scope of the present invention.

The standardized convention 216 is a systematic treatment of logical expressions including UNASSIGNED terms. For example, if a logical expression combines two terms in an AND relationship, where one term is TRUE and the second term is UNASSIGNED, the standardized convention 216 defines the result of the logical expression. The development of a standardized convention 216 for a given apparatus 200 is a mechanical step for one of skill in the art, but an example standardized convention 216 is presented for illustration.

The example standardized convention 216 comprises three truth tables, Table 1 for AND relationships, Table 2 for OR relationships, and Table 3 for NOT relationships. For Tables 1 and 2, one term is read from the first row, one term is read from the first column (the order of terms does not matter), and the result is found in the Table. For Table 3, only one term is used for a NOT expression, and the term is read from the first row, while the result is found in the second row.

TABLE 1

AND relationships truth table

| AND | TRUE | FALSE | NULL | UNASSIGNED |
|---|---|---|---|---|
| TRUE | TRUE | FALSE | NULL | TRUE |
| FALSE | FALSE | FALSE | FALSE | FALSE |
| NULL | NULL | FALSE | NULL | NULL |
| UNASSIGNED | TRUE | FALSE | NULL | UNASSIGNED |

TABLE 2

OR relationships truth table

| OR | TRUE | FALSE | NULL | UNASSIGNED |
|---|---|---|---|---|
| TRUE | TRUE | TRUE | TRUE | TRUE |
| FALSE | TRUE | FALSE | NULL | FALSE |
| NULL | TRUE | NULL | NULL | NULL |
| UNASSIGNED | TRUE | FALSE | NULL | UNASSIGNED |

TABLE 3

NOT relationships truth table

| NOT | TRUE | FALSE | NULL | UNASSIGNED |
|---|---|---|---|---|
|  | FALSE | TRUE | NULL | UNASSIGNED |

For example, two terms may be combined as <predicate 1> OR <predicate 2>, where <predicate 1> is UNASSIGNED and <predicate 2> is TRUE. In the example, the result as determined from Table 2 according to the example standardized convention 216 is TRUE. In one embodiment, the standardized convention 216 further includes ordering operations to preserve a standardized SQL convention. For example, standard SQL specifies that <predicate 1> OR <predicate 2> AND <predicate 3> evaluates as <predicate 1> OR (<predicate 2> AND <predicate 3>). Other standards and conventions are possible and within the skill of one in the art to develop.

In one embodiment, an SQL statement 110 includes a predicate clause involving at least one extended indicator parameter 204, and is configured to pass multiple rows of host variables 206 and their extended indicator parameters 204, where the SQL statement 110 is executed once for each row. In such an embodiment, the host variables 206 treated as UNASSIGNED must occur in the same columns of every row for a given execution plan 212 to support all of the rows. For example, the optimization module 116 may store an execution plan on the memory cache 218 for a given SQL statement as re-written 220, and/or for a given SQL statement 110 with a given host variable indicator 224, but the execution plan will not function correctly for a set of data records where a given column has some rows with host variables 206 treated as UNASSIGNED, and some rows with host variables 206 treated as a value other than UNASSIGNED.

In one embodiment, the optimization module 116 is configured to generate an SQL exception 202 where an SQL statement 110 has multiple rows of host variables 206, wherein at least one of the host variables 206 relates to an indicator parameter 204 in a predicate clause. In one embodiment, an SQL statement includes multiple rows of host variables 206 related to an indicator parameter 204 in a predicate clause, and the optimization module 116 generates an SQL exception 202 condition if any column involved with the predicate clause has some rows with host variables 206 treated as UNASSIGNED, and some rows with host variables 206 treated as a value other than UNASSIGNED.

In one embodiment, the DBMS 104 includes a database operations module 126 that performs database operations 228 such as a referential integrity check, an index maintenance, a materialized query maintenance, a pre-computed aggregate update, and/or a triggered action for a target column of the DBMS object 124 based on the SQL statement 110. A materialized query pre-computes some results utilized by a DBMS 104, and a change in the underlying data indicates that the materialized query should be re-generated. Pre-computed aggregate data may be pre-generated from underlying data that should be re-generated when the underlying data changes—for example in an update or insert operation. A triggered action refers to any action within a DBMS 104 that may be triggered in response to a change in the target column of the DBMS object 124.

The database operations module 126, in one embodiment, defers a database operation 228 for the target column of the DBMS object 124 until the host variables 206 for each data column of the DBMS object 124 are determined. The database operations module 126 bypasses the database operation(s) 228 for the target column of the DBMS object 124 when a data column that would otherwise activate the database operation(s) 228 has a host variable value 206 treated as UNASSIGNED. For example, an SQL statement 110 may UPDATE a data column of the DBMS object 124 used in a materialized query, and an UPDATE action for that data column ordinarily activates a database operation 228 which is an update of the materialized query. In the example, the database operations module 126 defers the database operation 228 until a host variable value 206 for the data column is determined. If the host variable value 206 is treated as UNASSIGNED, the SQL statement 110 is not actually changing the data column, and the database operations module 126 bypasses the database operation 228 to update the materialized query. In one embodiment, a change to any one of a number of data columns of one or more DBMS objects 124 may activate a database operation 228, and the database operations module 126 may bypass the database operation 228 when all data columns related to the database operation 228 have a host variable value 206 treated as UNASSIGNED.

FIG. 3 is a schematic illustration of one embodiment of a memory cache 218 in accordance with the present invention. The memory cache 218 includes cache entries 302. In one embodiment, the cache entries 302 correspond to an SQL statement 110, a host variable indicator 224, and a stored execution plan 304. In one embodiment, the SQL statements 110 may be SQL statements as re-written by the optimization module 116. For the purposes of the example, each cache entry 302 differs in some element from other cache entries 302. For example, the cache entry 302 "0001" has an identical SQL statement 110 to the cache entry "0002", but has a host variable indicator 224 of "000101" compared to "000100." In one embodiment, the optimization module 116 checks whether a matching cache entry 302 exists based on the SQL statement 110 and the host variable indicator 224.

The cache entry 0004 has an identical SQL statement 110 and host variable indicator 224 as the cache entry 0006, but the cache entry 0004 was created for an SQL statement 110 that has an extended indicators enabled indicator 306 that cache entry 0004 includes extended indicators 204. The cache entry 0006 was created for an SQL statement 110 that does not include extended indicators, and the stored execution plans 304 may differ between cache entry 0004 and cache entry 0006 accordingly. For example, the execution plan "Exec Plan D" may be configured to bypass writing any value to a column for a data record on the DBMS 104 when a corresponding column for a data record on the client application 106 in an UPDATE is not provided a value by a user. In the example, the execution plan "Exec Plan F" does not support updating columns "CDE" when a user does not provide a value for performing the update. In the present art, the utilization of cache entry 0006 where a user does not supply a value for one of the columns "CDE" may result in an SQL exception, or retrieval of a previous value from the column, and "Exec Plan F" writing the retrieved value back into the column. The stored execution plans 304 in FIG. 3 are shown only symbolically.

FIG. 4 is an illustration of one embodiment of a prepare syntax diagram 400 in accordance with the present invention. The prepare syntax diagram 400 follows the standard used in the art, and provides one illustration of a method to introduce extended indicators 204 into SQL in accordance with the present invention. Other potential syntax implementations are possible, and any implementation that enables the use of extended indicators 204 to efficiently support generic SQL data manipulation statements 110 is contemplated within the scope of the present invention.

FIG. 5 is an illustration of one embodiment of a declare cursor syntax diagram 500 in accordance with the present invention. The declare cursor syntax diagram 500 follows the standard used in the art, and provides one illustration of a method to introduce extended indicators 204 into SQL in accordance with the present invention. Other potential syntax implementations are possible, and any implementation that enables the use of extended indicators 204 to efficiently support generic SQL data manipulation statements 110 is contemplated within the scope of the present invention FIG. 6A is an illustration of one embodiment of a pseudo-code 600 generic SQL statement 110 allowing indicator parameters used in an insert operation in accordance with the present invention. The illustration of FIG. 6A is an example and is not complete code for a client application 106 to execute. The illustration shows a prepare statement 602 that may trigger the optimization module 116 to generate a prepared execution plan 212. The illustration further shows an execute statement 604 that may trigger the DBMS 104 to run execution plan 212 to perform the SQL statement 110. The illustration of FIG. 6A shows the creation of a table named EMPLOYEE, and the initialization of several variables only to provide context for, and to clarify, the SQL statement 110. The pseudo-code is consistent with the syntax diagrams 400, 500 provided earlier, but will not execute on a client application 106 without support in the client application 106 and DBMS 104 according to the disclosures herein.

FIG. 6B is an illustration of one embodiment of a pseudo-code 650 generic SQL statement allowing indicator parameters used in an update operation in accordance with the present invention. The illustration of FIG. 6B is an example and is not complete code for a client application 106 to execute. The illustration shows a prepare statement 602 that may trigger the optimization module 116 to generate a prepared execution plan 212. The illustration further shows an execute statement 604 that may trigger the DBMS 104 to run execution plan 212 to perform the SQL statement 110. The pseudo-code is consistent with the syntax diagrams 400, 500 and the pseudo-code 600 for creating the table "EMPLOYEE" provided earlier, but will not execute on a client application 106 without support in the client application 106 and DBMS 104 according to the disclosures herein.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 7:
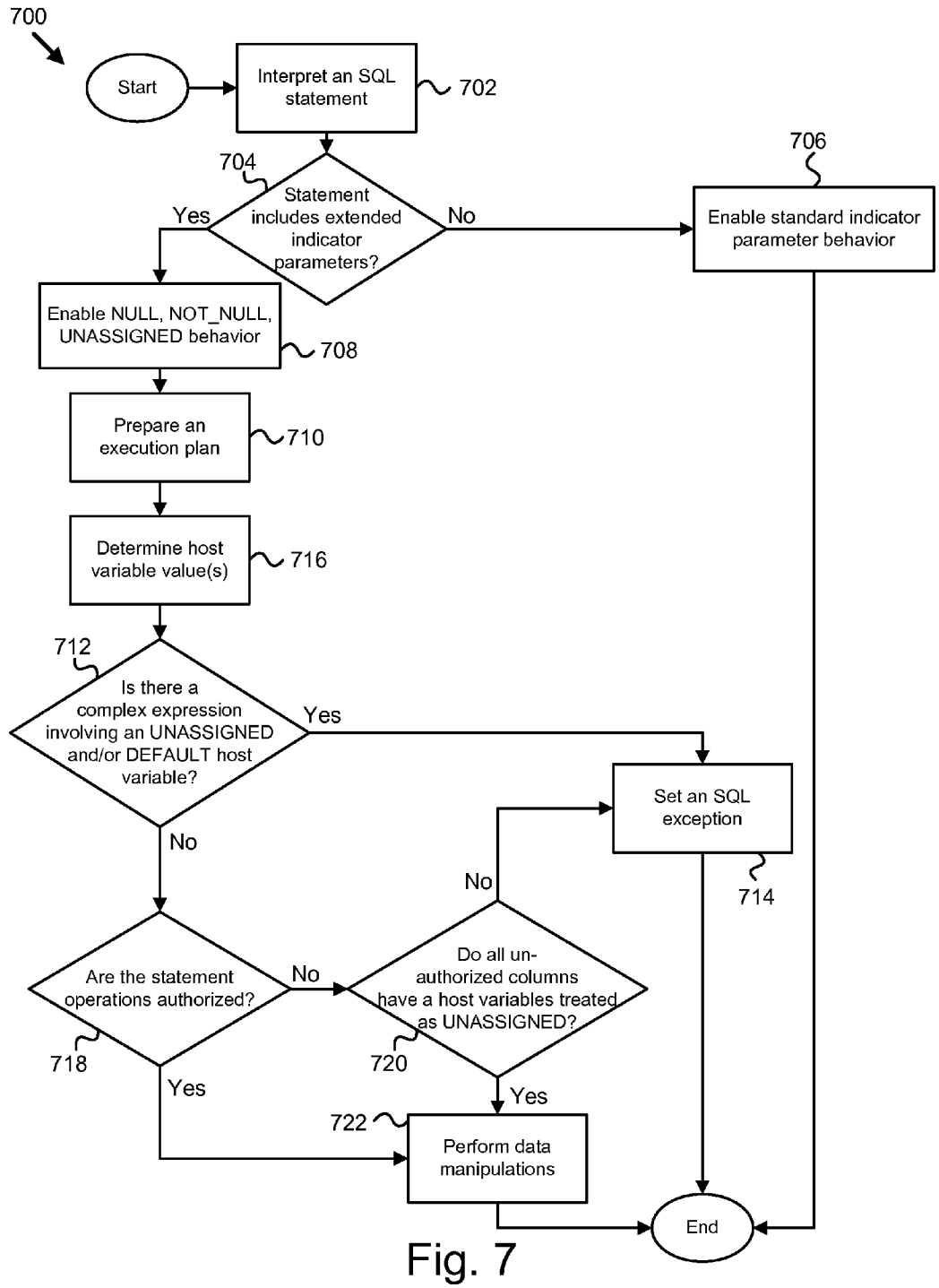
FIG. 7 is a schematic flow chart diagram illustrating one embodiment of a method for efficiently supporting generic SQL data manipulation statements in accordance with the present invention.

FIG. 7 is a schematic flow chart diagram illustrating one embodiment of a method 700 for efficiently supporting generic SQL data manipulation statements 110 in accordance with the present invention. The method 700 depicted in FIG. 7 substantially includes the steps to carry out the functions presented above with respect to the operation of the described system and apparatus of FIGS. 1 through 6. In one embodiment, the method 700 is implemented with a computer program product comprising a computer readable medium having a computer readable program. The DBMS 104 may execute the computer readable program. The method 700 includes an SQL input module 112 interpreting 702 an SQL statement and an extended indicator module 114 determining 704 whether the SQL statement 110 includes extended indicator parameters 204.

In one embodiment, the extended indicator module 114 enables 706 a standard indicator parameter behavior if the SQL statement 110 does not include extended indicators 204, and the method 700 ends. For example, standard indicator parameter behavior may comprise treating a host variable 206 related to a negative indicator parameter as a NULL host variable, and treating a host variable 206 related to a non-negative indicator parameter as a NOT_NULL host variable 206. Other operations outside the method 700 may complete the processing of the SQL statement 110 in the case where the SQL statement 110 does not include extended indicator parameters 204. The extended indicator module 114 may enable 708 NULL, NOT_NULL, and UNASSIGNED behavior when the SQL statement 110 includes extended indicator parameters 204.

The method 700 further includes an optimization module 116 preparing 710 an SQL execution plan 212 based on the SQL statement 110 and each extended indicator parameter 204. In one embodiment, the extended indicator module 114 determines 716 the values of each host variable 206. In one embodiment, the method 700 further includes an exception handling module 210 determining 712 whether a complex expression involves a host variable 206 and setting 714 an SQL exception if the determination 712 is positive. In one embodiment, the exception handling module 210 sets 714 the SQL exception only when any host variables 206 in the complex expression have a value treated as UNASSIGNED and/or DEFAULT.

If the determination 712 is negative, in one embodiment the method 700 includes an authorization module 118 determining 718 whether the SQL statement 110 operations are authorized. If the SQL statement 110 operations are not authorized, the authorization module 118 may determine 720 whether all unauthorized columns have a host variable value 206 treated as UNASSIGNED. The columns may be unauthorized for insert access, update access, insertability, updateability, and/or selection. If the operations are unauthorized, and all unauthorized column operations do not have a host variable value 206 treated as UNASSIGNED, the exception handling module 210 sets 714 an SQL exception 202 and the method 700 ends. If the SQL statement 110 operations are authorized, or if all unauthorized SQL statement 110 column operations have a host variable value 206 treated as UNASSIGNED, a DBMS 104 may perform 722 data manipulations according to the SQL execution plan 212.

Figure 8:
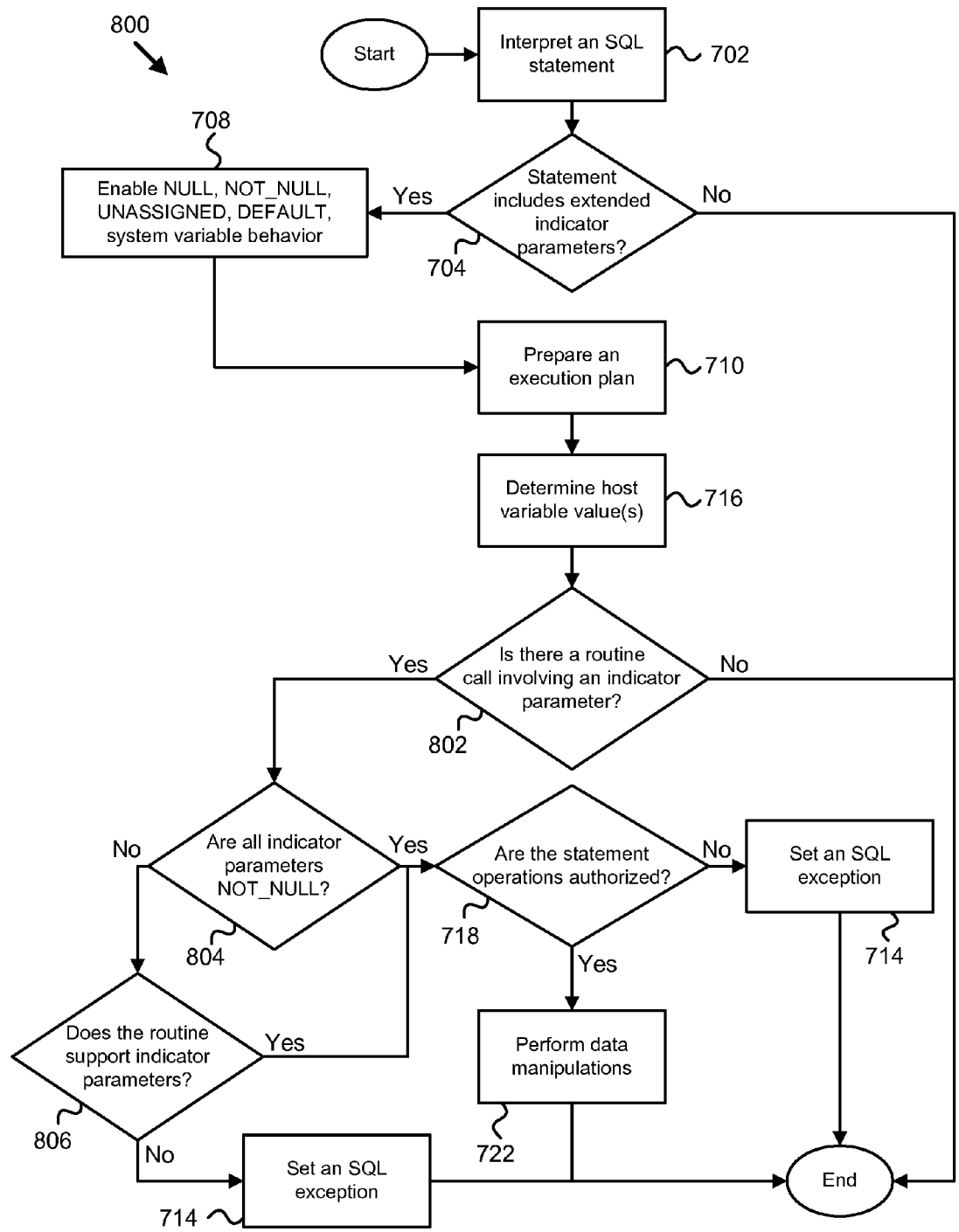
FIG. 8 is a schematic flow chart diagram illustrating an alternate embodiment of a method for efficiently supporting generic SQL data manipulation statements in accordance with the present invention.

FIG. 8 is a schematic flow chart diagram illustrating an alternate embodiment of a method 800 for efficiently supporting generic SQL data manipulation statements 110 in accordance with the present invention. The method 800 depicted in FIG. 8 substantially includes the steps to carry out the functions presented above with respect to the operation of the described system and apparatus of FIGS. 1 through 6. In one embodiment, the method 800 is implemented with a computer program product comprising a computer readable medium having a computer readable program. The DBMS 104 may execute the computer readable program. The method 800 includes an SQL input module 112 interpreting 702 an SQL statement and an extended indicator module 114 determining 704 whether the SQL statement 110 includes extended indicator parameters 204. The extended indicator module 114 may enable 708 NULL, NOT_NULL, and UNASSIGNED behavior when the SQL statement 110 includes extended indicator parameters 204. The method 800 further includes an optimization module 116 preparing 710 an SQL execution plan 212 based on the SQL statement 110 and each extended indicator parameter 204. In one embodiment, the extended indicator module 114 determines 716 the values of each host variable 206.

The method 800 further includes a optimization module 116 determining 802 whether the SQL statement 110 includes a routine call involving an indicator parameter 204, and ending the method 800 if the SQL statement 110 does not include a routine call involving an indicator parameter 204. Other operations outside the method 800 may complete the processing of the SQL statement 110 in the case where the SQL statement 110 does not include a routine call involving an indicator parameter 204. If the SQL statement 110 includes a routine call involving an indicator parameter 204, the method 800 includes the optimization module 116 checking 804 whether all indicator parameters 204 involved with the routine call have a specific value indicating that their related host variable 206 should be treated as NOT_NULL. If all indicator parameters 204 involved with the routine call have a specific value indicating that their related host variable 206 should be treated as NOT_NULL, the method 800 may conclude with SQL operations such as authorization checks 718, and data manipulations 722, similar to the method 700 of FIG. 7.

If all indicator parameters 204 involved with the routine call do not have a specific value indicating that their related host variable 206 should be treated as NOT_NULL, the method 800 may include the optimization module 116 checking 806 whether the routine called supports indicator parameters 204 passed to the routine. If the routine supports indicator parameters 204 passed to the routine, the method 800 may conclude with SQL operations such as authorization checks 718, and data manipulations 722, similar to the method 700 of FIG. 7. If the routine does not support indicator parameters 204 passed to the routine, the method 800 may include an exception handling module 210 setting 714 an SQL exception 202.

Figure 9:
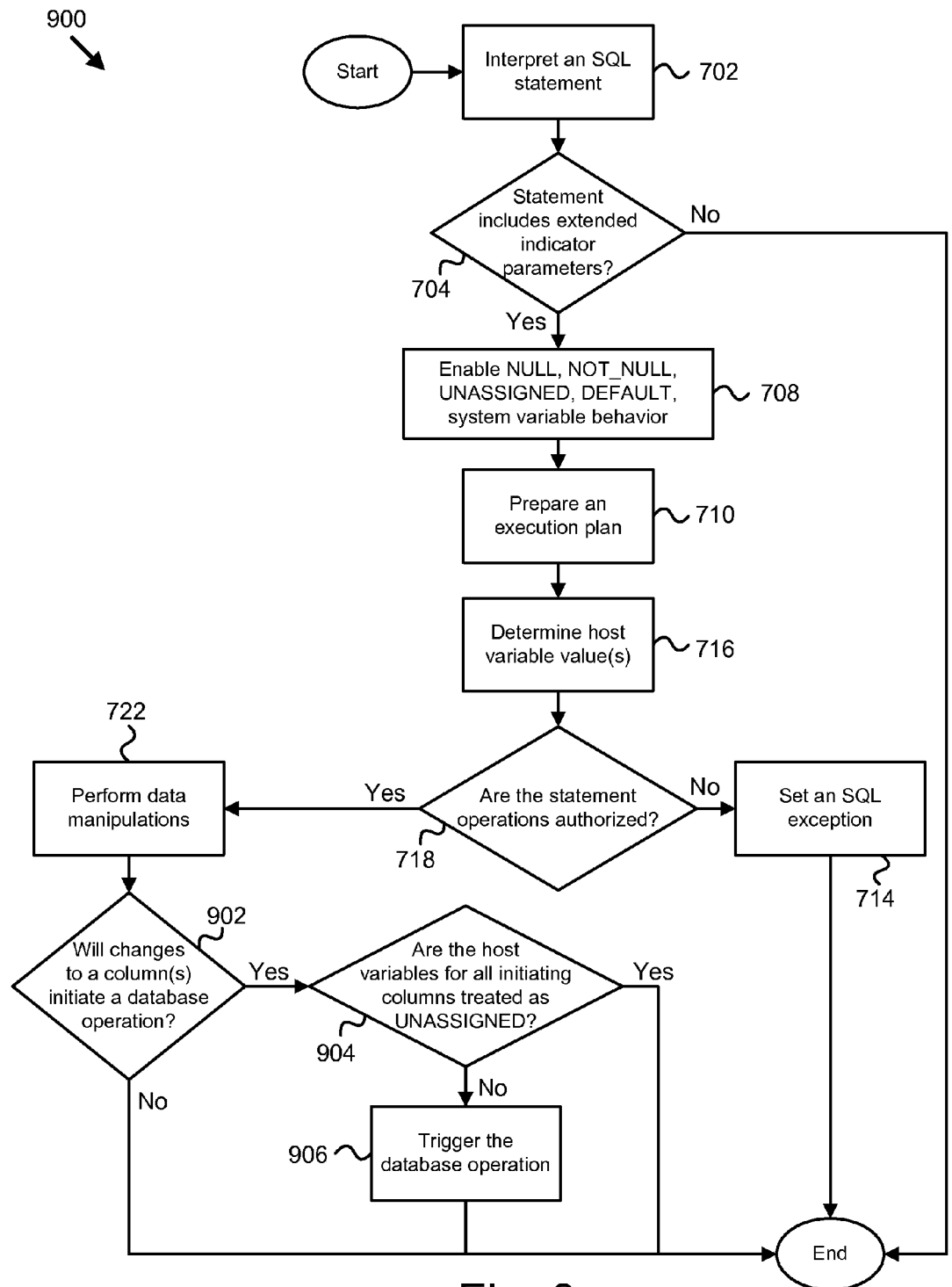
FIG. 9 is a schematic flow chart diagram illustrating an alternate embodiment of a method for efficiently supporting generic SQL data manipulation statements in accordance with the present invention.

FIG. 9 is a schematic flow chart diagram illustrating an alternate embodiment of a method 900 for efficiently supporting generic SQL data manipulation statements in accordance with the present invention. The method 900 depicted in FIG. 9 substantially includes the steps to carry out the functions presented above with respect to the operation of the described system and apparatus of FIGS. 1 through 6. In one embodiment, the method 900 is implemented with a computer program product comprising a computer readable medium having a computer readable program. The DBMS 104 may execute the computer readable program. The method 900 includes an SQL input module 112 interpreting 702 an SQL statement and an extended indicator module 114 determining 704 whether the SQL statement 110 includes extended indicator parameters 204. In one embodiment, the SQL statement 110 does not include extended indicator parameters 204 and the method 900 ends. Other operations outside the method 900 may complete the processing of the SQL statement 110 in the case where the SQL statement 110 does not include extended indicator parameters 204.

The extended indicator module 114 may enable 708 NULL, NOT_NULL, and UNASSIGNED behavior when the SQL statement 110 includes extended indicator parameters 204. The method 900 further includes an optimization module 116 preparing 710 an SQL execution plan 212 based on the SQL statement 110 and each extended indicator parameter 204. In one embodiment, the extended indicator module 114 determines 716 the values of each host variable 206.

The method 900 includes an authorization module 118 determining 718 whether the SQL statement 110 operations are authorized. If the SQL statement 110 operations are not authorized, the exception handling module 210 may set 714 an SQL exception 202 and end the method. If the SQL statement 110 operations are authorized, a DBMS 104 may perform 722 data manipulations according to the SQL execution plan 212. The method 900 further includes checking 902 whether changes to a column(s) will initiate a database operation 228. If the changes from the data manipulations 722 do not initiate a database operation 228, the method 900 ends. If the changes from the data manipulations 722 initiate a database operation 228, the method 900 includes a database operations module 126 checking 904 whether the host variables 206 for all columns that would initiate the database operation 228 have values treated as UNASSIGNED, and the database operations module 126 may bypass the database operations 228 by ending the method 900 if all columns that would initiate the database operation 228 have host variable 206 values treated as UNASSIGNED. The database operations module 126 may trigger 906 the database operations 228 if all columns that would initiate the database operation 228 do not have host variable 206 values that are treated as UNASSIGNED.

Figure 10:
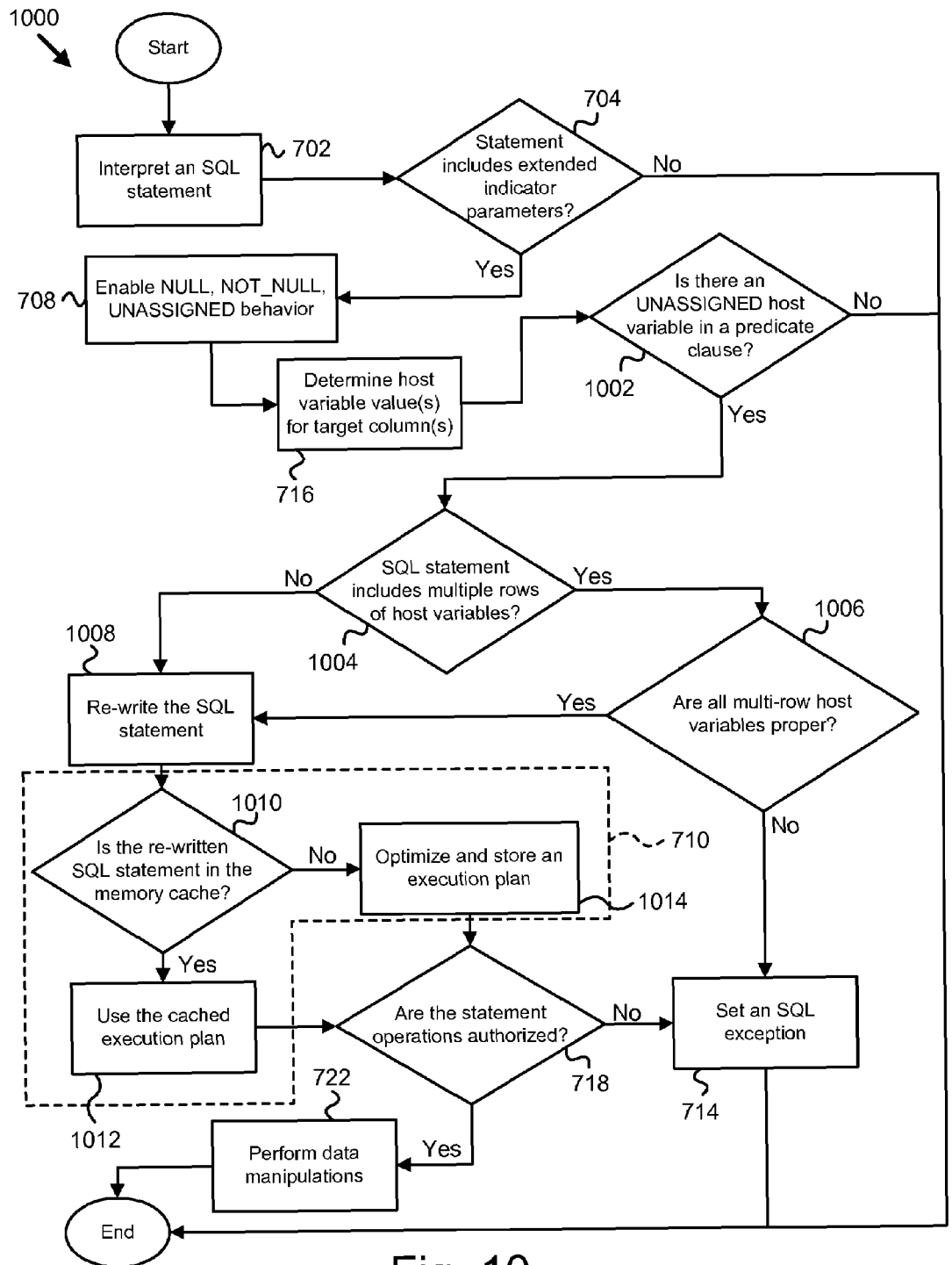
FIG. 10 is a schematic flow chart diagram illustrating an alternate embodiment of a method for efficiently supporting generic SQL data manipulation statements in accordance with the present invention.

FIG. 10 is a schematic flow chart diagram illustrating an alternate embodiment of a method 1000 for efficiently supporting generic SQL data manipulation statements in accordance with the present invention. The method 1000 depicted in FIG. 10 substantially includes the steps to carry out the functions presented above with respect to the operation of the described system and apparatus of FIGS. 1 through 6. In one embodiment, the method 1000 is implemented with a computer program product comprising a computer readable medium having a computer readable program. The DBMS 104 may execute the computer readable program. The method 1000 includes an SQL input module 112 interpreting 702 an SQL statement and an extended indicator module 114 determining 704 whether the SQL statement 110 includes extended indicator parameters 204. The extended indicator module 114 may enable 708 NULL, NOT_NULL, and UNASSIGNED behavior when the SQL statement 110 includes extended indicator parameters 204. In one embodiment, the extended indicator module 114 determines 716 the values of each host variable 206.

The method 1000 further includes a predicate handling module 120 checking 1002 whether a host variable 206 treated as UNASSIGNED occurs in a predicate clause. If no host variables 206 treated as UNASSIGNED occur in a predicate clause, the method 1000 ends, and other operations outside the method 1000 may complete the processing of the SQL statement 110. If a host variable 206 treated as UNASSIGNED occurs in a predicate clause, the method 1000 may include the predicate handling module 120 checking 1004 whether the SQL statement 110 includes multiple rows of host variables 206. Where the SQL statement 110 includes multiple rows of host variables 206, the predicate handling module 120 may further check 1006 whether all multi-row host variables are proper, which includes at least determining that no column involved with the predicate has some rows with host variables 206 treated as UNASSIGNED, and some rows with host variables 206 treated as a value other than UNASSIGNED. If the multi-row host variables are not proper, the exception handling module 210 sets 714 an SQL exception 202 and the method 1000 ends.

If the multi-row host variables are proper and/or if the SQL statement does not include multiple rows of host variables 206, the predicate handling module 120 re-writes the SQL statement 110 based on the SQL statement 110, the values of the host variables 206, and/or a standardized convention 216. The method 1000 further includes the optimization module 116 preparing 710 an execution plan 212. Preparing 710 the execution plan 212 includes checking 1010 whether a re-written SQL statement matching the re-written SQL statement 220 is in a memory cache 218. If a matching SQL statement is in the memory cache 218, the optimization module 116 uses 1012 a cached execution plan associated with the matching SQL statement from the memory cache 218 as the prepared execution plan 212. If there is no matching SQL statement in the memory cache 218, the optimization module 116 optimizes 1014 an execution plan based on the host variable values 206 and/or the re-written SQL statement, stores the optimized execution plan 222 on the memory cache 218, and utilizes the optimized execution plan 222 as the prepared execution plan 212.

The method 1000 may conclude with SQL operations such as authorization checks 718, and data manipulations 722, similar to the method 700 of FIG. 7.

Figure 11:
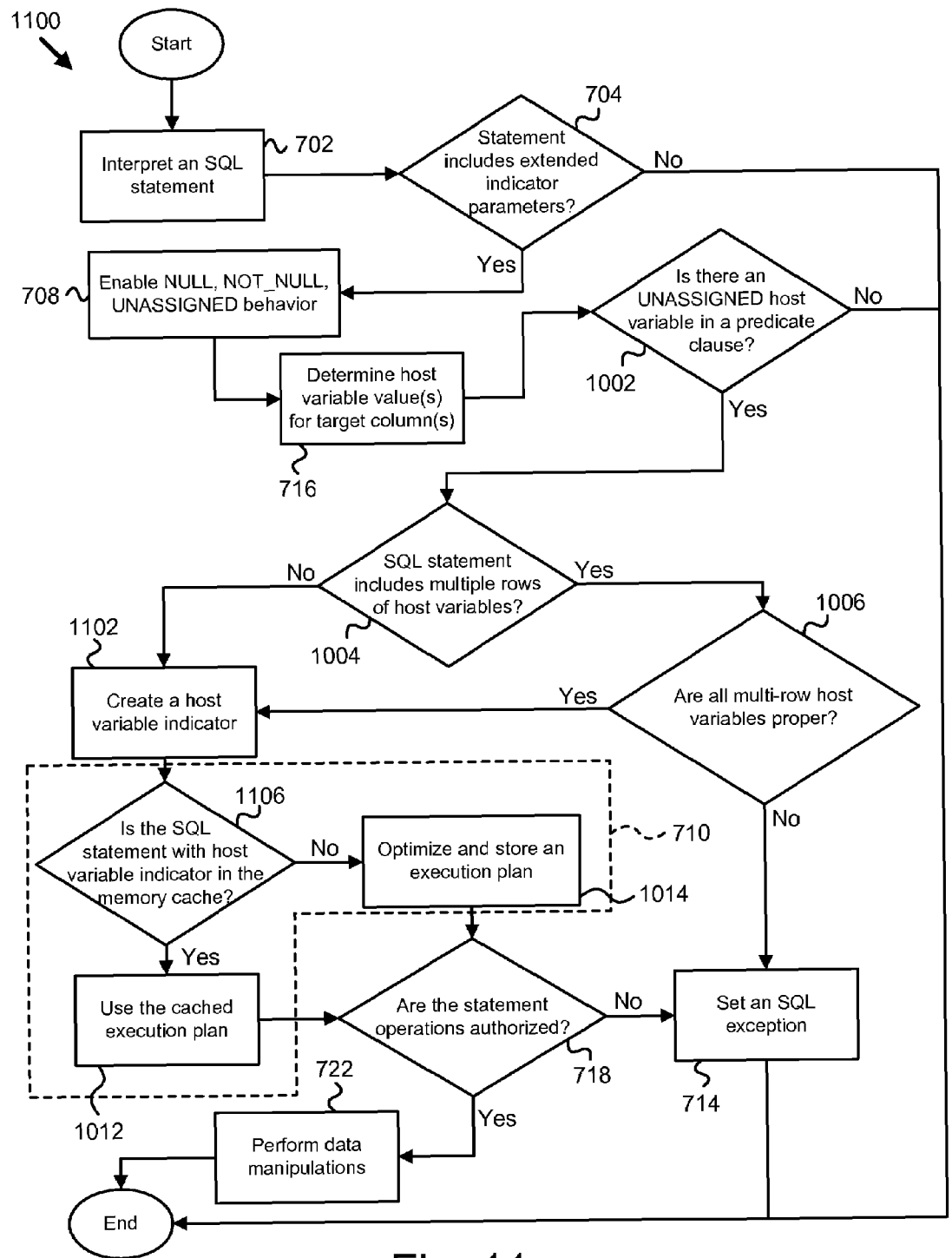
FIG. 11 is a schematic flow chart diagram illustrating an alternate embodiment of a method for efficiently supporting generic SQL data manipulation statements in accordance with the present invention.

FIG. 11 is a schematic flow chart diagram illustrating an alternate embodiment of a method 1100 for efficiently supporting generic SQL data manipulation statements in accordance with the present invention. The method 1100 depicted in FIG. 11 substantially includes the steps to carry out the functions presented above with respect to the operation of the described system and apparatus of FIGS. 1 through 6. In one embodiment, the method 1100 is implemented with a computer program product comprising a computer readable medium having a computer readable program. The DBMS 104 may execute the computer readable program. The method 1100 includes an SQL input module 112 interpreting 702 an SQL statement and an extended indicator module 114 determining 704 whether the SQL statement 110 includes extended indicator parameters 204. The extended indicator module 114 may enable 708 NULL, NOT_NULL, and UNASSIGNED behavior when the SQL statement 110 includes extended indicator parameters 204. In one embodiment, the extended indicator module 114 determines 716 the values of each host variable 206.

The method 1100 further includes a predicate handling module 120 checking 1002 whether a host variable 206 treated as UNASSIGNED occurs in a predicate clause. If no host variables 206 treated as UNASSIGNED occur in a predicate clause, the method 1100 ends, and other operations outside the method 1100 may complete the processing of the SQL statement 110. If a host variable 206 treated as UNASSIGNED occurs in a predicate clause, the method 1100 may include the predicate handling module 120 checking 1004 whether the SQL statement 110 includes multiple rows of host variables 206. Where the SQL statement 110 includes multiple rows of host variables 206, the predicate handling module 120 may further check 1006 whether all multi-row host variables are proper, which includes at least determining that no column involved with the predicate has some rows with host variables 206 treated as UNASSIGNED, and some rows with host variables 206 treated as a value other than UNASSIGNED. If the multi-row host variables are not proper, the exception handling module 210 sets 714 an SQL exception 202 and the method 1100 ends.

If the multi-row host variables are proper and/or if the SQL statement does not include multiple rows of host variables 206, the predicate handling module 120 creates 1102 a host variable indicator, the host variable indicator 224 denoting which host variables related to indicator parameters in the predicate clause are treated as UNASSIGNED. The method 1100 further includes the optimization module 116 preparing 710 an execution plan 212. Preparing 710 the execution plan 212 includes checking 1106 whether an entry in the memory cache contains the SQL statement 110 with the same host variable indicator 224. If a matching entry is in the memory cache 218, the optimization module 116 uses 1012 a cached execution plan associated with the matching SQL statement 110 and host variable indicator 224 from the memory cache 218 as the prepared execution plan 212. If there is no matching SQL statement in the memory cache 218, the optimization module 116 optimizes 1014 an execution plan based on the host variable values 206, the SQL statement 110, and/or a standardized convention 216, stores the optimized execution plan 222 on the memory cache 218, and utilizes the optimized execution plan 222 as the prepared execution plan 212.

The method 1100 may conclude with SQL operations such as authorization checks 718, and data manipulations 722, similar to the method 700 of FIG. 7.

Figure 12:
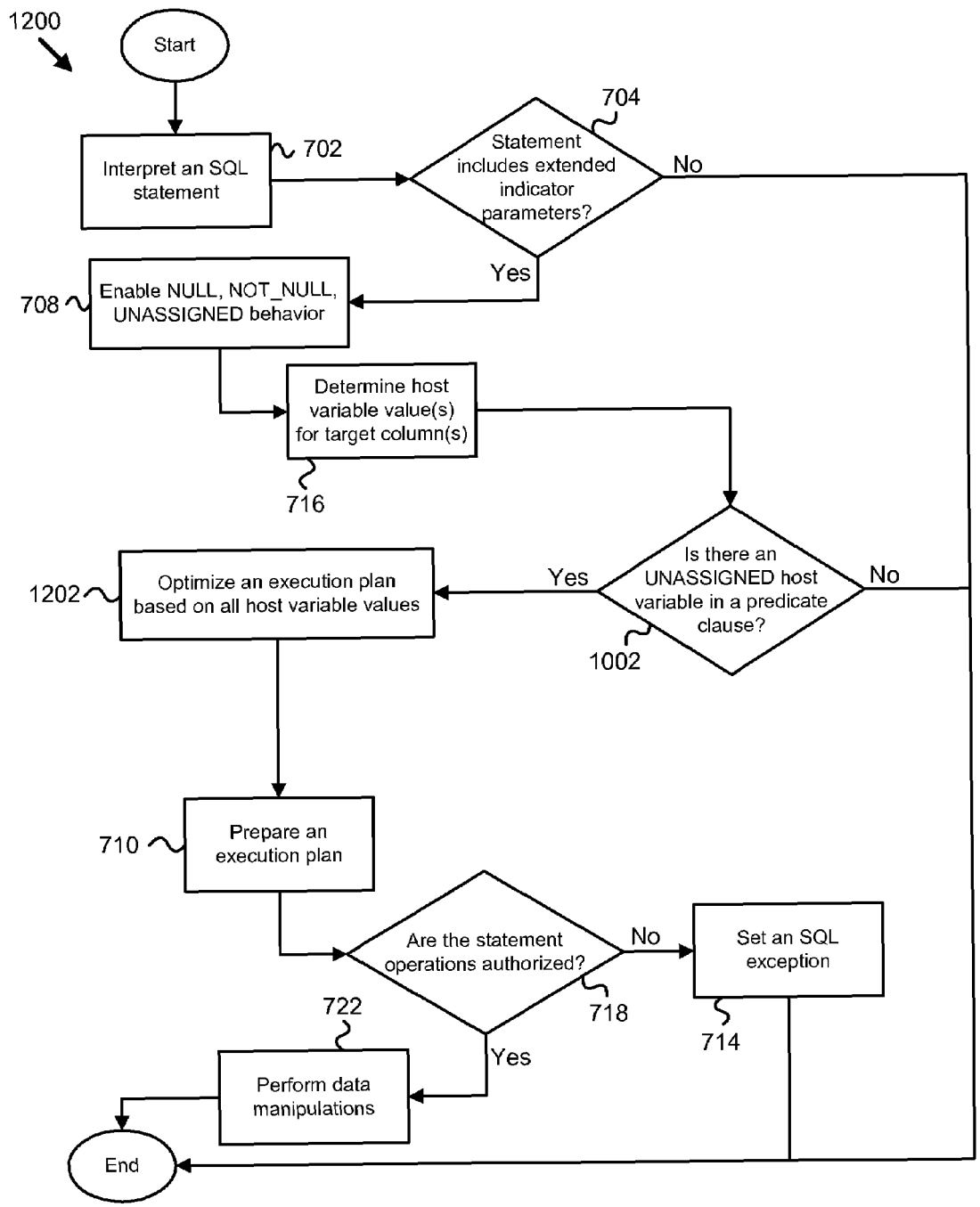
FIG. 12 is a schematic flow chart diagram illustrating an alternate embodiment of a method for efficiently supporting generic SQL data manipulation statements in accordance with the present invention.

FIG. 12 is a schematic flow chart diagram illustrating an alternate embodiment of a method 1200 for efficiently supporting generic SQL data manipulation statements in accordance with the present invention. The method 1200 depicted in FIG. 12 substantially includes the steps to carry out the functions presented above with respect to the operation of the described system and apparatus of FIGS. 1 through 6. In one embodiment, the method 1200 is implemented with a computer program product comprising a computer readable medium having a computer readable program. The DBMS 104 may execute the computer readable program. The method 1200 includes an SQL input module 112 interpreting 702 an SQL statement and an extended indicator module 114 determining 704 whether the SQL statement 110 includes extended indicator parameters 204. The extended indicator module 114 may enable 708 NULL, NOT_NULL, and UNASSIGNED behavior when the SQL statement 110 includes extended indicator parameters 204. In one embodiment, the extended indicator module 114 determines 716 the values of each host variable 206.

The method 1200 further includes a predicate handling module 120 checking 1002 whether a host variable 206 treated as UNASSIGNED occurs in a predicate clause. If no host variables 206 treated as UNASSIGNED occur in a predicate clause, the method 1200 ends, and other operations outside the method 1200 may complete the processing of the SQL statement 110. If an UNASSIGNED host variable 206 occurs in a predicate clause, the method 1200 may include an optimization module 116 optimizing an execution plan 222 based on the SQL statement 110, the values of all host variables 206 in the SQL statement 110, and/or a standardized convention 216. The method 1200 further includes the optimization module 116 utilizing 710 the optimized execution plan 222 as a prepared SQL execution plan 212. The method 1200 may conclude with SQL operations such as authorization checks 718, and data manipulations 722, similar to the method 700 of FIG. 7.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for efficiently supporting generic SQL data manipulation statements, the apparatus comprising:

a structured query language (SQL) input module configured to interpret a generic SQL statement from a client application, wherein the generic SQL statement comprises at least one of a statement that references all of the data columns that can experience a change when the generic SQL statement is executed and a statement referencing all of the data columns that can be involved in a selection criteria, and wherein the generic SQL statement includes extended indicator parameters and one of an insert, update, select, and merge operation directed to a target column of a database management system (DBMS) object;

an extended indicator module configured to determine whether the generic SQL statement includes at least one extended indicator parameter, wherein the at least one extended indicator parameter enables the client application and a database management system (DBMS) receiving the generic SQL statement to exchange information regarding NULL values, and wherein each extended indicator parameter has a value indicating that a related host variable is treated as one of NULL, NOT_NULL, and UNASSIGNED, wherein treating the host variable as NOT_NULL comprises utilizing a value of the host variable;

an authorization module configured to determine the host variable value for the target column of the DBMS object, and bypass an authorization check when the host variable value for the target column is treated as UNASSIGNED;

an optimization module configured to prepare an SQL execution plan based on the generic SQL statement and each extended indicator parameter; and wherein the SQL input module, extended indicator module, and optimization module are at least one of software stored on computer readable media and hardware circuits.

2. The apparatus of claim 1, further comprising an SQL exception handling module configured to generate an SQL exception condition if the SQL statement includes a complex expression involving a host variable.

3. The apparatus of claim 1, wherein the SQL statement includes extended indicator parameters, and includes an update operation directed to a target column of a database management system (DBMS) object, wherein the apparatus further comprises a database operations module configured to determine a host variable value for the target column of the DBMS object, and bypass a database operation that would otherwise activate based on the update of the target column of the DBMS object when the host variable value for the target column of the DBMS object is treated as UNASSIGNED, wherein the database operation comprises at least one of a triggered action, a referential integrity check, an index maintenance, a materialized query maintenance, a pre-computed aggregate update.

4. The apparatus of claim 1, wherein the SQL statement includes a predicate clause involving at least one indicator parameter;
wherein the apparatus further comprises a predicate handling module configured to check whether any indicator parameter within a predicate clause has a value indicating that a related host variable value is treated as UNASSIGNED, to re-write the SQL statement based on the predicate clause involving at least one indicator parameter and a standard convention, and to check whether a memory cache contains an matching entry for the SQL statement as re-written; and
wherein the optimization module is further configured to utilize a stored execution plan from a memory cache as the SQL execution plan if the memory cache contains an entry for the SQL statement as re-written, and to develop an optimized execution plan based on the SQL statement as re-written, to store the optimized execution plan, and to utilize the optimized execution plan as the SQL execution plan if the memory cache does not contain an entry for the SQL statement as re-written.

5. The apparatus of claim 1, wherein the SQL statement includes a predicate clause involving at least one indicator parameter:
wherein the apparatus further comprises a predicate handling module configured to determine a host variable indicator based on each indicator parameter indicating that a related host variable value is treated as UNASSIGNED, to check whether a memory cache contains a matching entry for the SQL statement and host variable indicator; and
wherein the optimization module is further configured to utilize a stored execution plan from the memory cache as the SQL execution plan if the memory cache contains an entry for the SQL statement and host variable indicator, and to develop an optimized execution plan based on the SQL statement, the host variable indicator and a standardized convention, to store the optimized execution plan, and to utilize the optimized execution plan as the SQL execution plan if the memory cache does not contain an entry for the SQL statement and host variable indicator.

6. The apparatus of claim 1, wherein the SQL statement includes a predicate clause involving at least one indicator parameter, wherein the apparatus further comprises a predicate handling module configured to check the values of each indicator parameter involved with the predicate clause to determine the values of each host variable, wherein the optimization module is further configured to develop an optimized execution plan based on the SQL statement, the values of each host variable, and a standardized convention, and to utilize the optimized execution plan as the SQL execution plan.

7. The apparatus of claim 1, wherein each extended indicator parameter has a specific value indicating that a related host variable is treated as one of NULL, NOT_NULL, a defined system variable, DEFAULT, and UNASSIGNED, wherein treating the host variable as NOT_NULL comprises utilizing a value of the host variable.

8. The apparatus of claim 7, wherein the SQL statement comprises a generic SQL statement, and wherein the optimization module is further configured to prepare the SQL execution plan such that:

when a host variable for a data column is treated as UNASSIGNED, the SQL execution plan does not provide a value for writing to the data column;
when a host variable for the data column is treated as DEFAULT, the SQL execution plan writes a default value to the data column; and
when a host variable for the data column is treated as a defined system variable, the SQL execution plan writes the defined system variable to the data column.

9. The apparatus of claim 7 wherein the SQL statement includes an expression involving a host variable passed to a routine, the apparatus further comprising an exception handling module configured to generate an SQL exception condition.

10. A computer program product comprising a computer readable medium having a computer readable program, wherein the computer readable program when executed on a computer cause the computer to:
interpret a generic structured query language (SQL) statement from a client application, wherein the generic SQL statement comprises at least one of a statement that references all of the data columns that can experience a change when the generic SQL statement is executed and a statement referencing all of the data columns that can be involved in a selection criteria, and wherein the generic SQL statement further comprises at least one extended indicator parameter and includes one of an insert, update, select, and merge operation directed to a target column of a DBMS object;
determine whether the generic SQL statement includes at least one extended indicator parameter, wherein at least one extended indicator parameter enables the client application and a database management system (DBMS) receiving the generic SQL statement to exchange information regarding NULL values, and wherein each extended indicator parameter has a specific value indicating that a related host variable is treated as one of NULL, NOT_NULL, and UNASSIGNED, wherein treating the host variable as NOT_NULL comprises utilizing a value of the host variable;
defer checking an authorization until the host variable value for the target column of the DBMS object is determined, and to bypass the authorization check when the target column has a host variable treated as UNASSIGNED; and
prepare an SQL execution plan based on the SQL statement and each extended indicator parameter.

11. The computer program product of claim 10, wherein the SQL statement does not include extended indicator parameters, and wherein the computer readable program is further configured to cause the computer to treat a host variable related to a negative indicator parameter as a NULL host variable, and treat a host variable related to an non-negative indicator parameter as a NOT_NULL host variable.

12. The computer program product of claim 10, wherein the computer readable program is further configured to cause the computer to generate an SQL exception condition if the SQL statement includes a complex expression involving a host variable with a value treated as UNASSIGNED.

13. The computer program product of claim 10, wherein the extended indicator parameters include an indicator parameter having a specific value indicating that a related host variable is treated as one of NULL, NOT_NULL, DEFAULT, UNASSIGNED, and a defined system variable.

14. The computer program product of claim 13, wherein the computer readable program is further configured to cause the computer to generate an SQL exception condition if the SQL statement includes a complex expression involving a host variable with a value treated as one of UNASSIGNED and DEFAULT.

15. The computer program product of claim 13, wherein the SQL statement includes an expression involving a host variable passed to a routine, and wherein the computer readable program is further configured to cause the computer to generate an SQL exception condition if: the routine supports only host variables treated as NOT_NULL and the expression involving a host variable includes at least one host variable treated as a value other than NOT_NULL.

16. The computer program product of claim 13, wherein the SQL statement comprises a generic SQL statement, and wherein the computer readable program is further configured to cause the computer to write a DEFAULT value to a data column when a host variable for the data column is treated as DEFAULT.

17. The computer program product of claim 13, wherein the SQL statement comprises a generic SQL statement, and wherein the computer readable program is further configured to cause the computer to write a value of the defined system variable to a data column when a host variable for the data column is treated as the defined system variable.

18. The computer program product of claim 10, wherein the SQL statement includes extended indicator parameters and includes an insert operation directed to a target column of a DBMS object, wherein the computer readable program is further configured to cause the computer to defer checking an insert authorization and an insertability for the target column of the DBMS object until the host variable value for the target column of the DBMS object is determined, and to bypass an SQL exception when: a data column is unauthorized for at least one of insert access and insertability, but the data column has a host variable treated as UNASSIGNED.

19. The computer program product of claim 10, wherein the SQL statement includes extended indicator parameters and includes an update operation directed to a target column of a DBMS object, wherein the computer readable program is further configured to cause the computer to trigger a database operation comprising at least one of a referential integrity check, an index maintenance, a triggered action, a materialized query maintenance, and a pre-computed aggregate update, when an update occurs to the target column unless the target column has a host variable value treated as UNASSIGNED.

20. The computer program product of 10, wherein the SQL statement includes extended indicator parameters and includes an update operation directed to a plurality of target columns of a DBMS object, wherein the computer readable program is further configured to cause the computer to trigger a database operation comprising at least one of a referential integrity check, an index maintenance, a triggered action, a materialized query maintenance, and a pre-computed aggregate update, when an update occurs to any of the target columns unless the host variable value for each target column of the DBMS object has a host variable value treated as UNASSIGNED.

21. The computer program product of claim 10 wherein the SQL statement includes a predicate clause involving at least one extended indicator parameter, wherein the computer readable program is further configured to cause the computer to:
check whether any indicator parameter within the predicate clause has a value indicating that a related host variable value is treated as UNASSIGNED;
re-write the SQL statement according to a standardized convention;
check whether a memory cache contains an entry for the SQL statement as re-written;
if the memory cache contains an entry for the SQL statement as re-written: to utilize a stored execution plan from the memory cache as the SQL execution plan; and
if the memory cache does not contain an entry for the SQL statement as re-written: to optimize an execution plan for the SQL statement as re-written, to store the optimized execution plan with the SQL statement as re-written as a new cache entry, and to utilize the optimized execution plan as the SQL execution plan.

22. The computer program product of claim 10, wherein the SQL statement includes multiple rows of host variables, wherein at least one of the host variables relates to an indicator parameter in a predicate clause, and wherein the computer readable program is further configured to cause the computer to generate an SQL exception condition.

23. The computer program product of claim 22, wherein the SQL statement includes multiple rows of host variables related to an indicator parameter in a predicate clause, wherein the computer readable program is further configured to cause the computer to generate an SQL exception condition if: any column involved with the predicate clause has some rows with host variables treated as UNASSIGNED and some rows with host variables treated as a value other than UNASSIGNED.

24. The computer program product of claim 10 wherein the SQL statement includes a predicate clause involving at least one extended indicator parameter, wherein the computer readable program is further configured to cause the computer to:
check the values of each indicator parameter involved with the predicate clause to determine which host variables are treated as UNASSIGNED;
optimize an execution plan for the SQL statement based on the SQL statement, the host variables that are treated as UNASSIGNED, and a standardized convention; and
utilize the optimized execution plan as the SQL execution plan.

25. The computer program product of claim 24, wherein the computer readable program is further configured to cause the computer to:
determine a host variable indicator, the host variable indicator denoting which host variables related to indicator parameters in the predicate clause are treated as UNASSIGNED;
check whether a memory cache contains an entry for the SQL statement according to the host variable indicator;
if the memory cache contains an entry for the SQL statement: utilize a stored execution plan from the memory cache as the SQL execution plan; and
if the memory cache does not contain an entry for the SQL statement: store the optimized execution plan with the host variable indicator and SQL statement as a new cache entry.

26. The computer program product of claim 25, wherein the SQL statement includes multiple rows of host variables, wherein at least one of the host variables relates to an indicator parameter in a predicate clause, wherein the computer readable program is further configured to cause the computer to generate an SQL exception condition.

27. The computer program product of claim 10 wherein the SQL statement includes a predicate clause involving at least one extended indicator parameter, wherein the computer readable program is further configured to cause the computer to:
- check the values of each indicator parameter involved with the predicate clause to determine the values of each host variable;
- optimize an execution plan based on the SQL statement, the values of each host variable and a standardized convention; and
- utilize the optimized execution plan as the SQL execution plan.

28. A system for efficiently supporting generic SQL data manipulation statements, the system comprising:
- a server hosting a database management system (DBMS);
- a client application;
- a network connecting the server and the client application;
- wherein the DBMS comprises:
  - a structured query language (SQL) input module configured to interpret a generic SQL statement from a client application, wherein the generic SQL statement comprises at least one of a statement that references all of the data columns that can experience a change when the generic SQL statement is executed and a statement referencing all of the data columns that can be involved in a selection criteria, and wherein the generic SQL statement further comprises at least one extended indicator parameter and includes one of an insert, update, select, and merge operation directed to a target column of a DBMS object;
  - an extended indicator module configured to determine whether the SQL statement includes extended indicator parameters that enable the client application and the DMBS receiving the generic SQL statement to exchange information regarding NULL values, wherein the extended indicator parameters include an indicator parameter having a value indicating that a related host variable is treated as a member selected from the group consisting of: NULL NOT_NULL, and UNASSIGNED;
  - an authentication module configured to defer checking an authorization until the host variable value for the target column of the DBMS object is determined, and to bypass the authorization check when the target column has a host variable treated as UNASSIGNED; and
  - an optimization module configured to prepare an SQL execution plan based on the SQL statement and each indicator parameter.

29. The system of claim 28, wherein the SQL statement includes a predicate clause involving at least one indicator parameter, wherein the DBMS further comprises:
- a predicate handling module configured to determine a host variable indicator based on each indicator parameter indicating that a related host variable value is treated as UNASSIGNED, to check whether a memory cache contains a matching entry for the SQL statement and host variable indicator; and
- wherein the optimization module is further configured to utilize a stored execution plan from the memory cache if the memory cache contains an entry for the SQL statement and host variable indicator, and to develop an optimized execution plan based on the SQL statement, the host variable indicator and a standardized convention, to store the optimized execution plan, and to utilize the optimized execution plan as the SQL execution plan if the memory cache does not contain an entry for the SQL statement and host variable indicator.

30. The system of claim 28, wherein the SQL statement includes extended indicator parameters, and includes an update operation directed to a target column of a database management system (DBMS) object, wherein the DBMS further comprises a database operations module configured to determine a host variable value for the target column of the DBMS object, and bypass a database operation that would otherwise activate based on the update of the target column of the DBMS object when the host variable value for the target column of the DBMS object is treated as UNASSIGNED, wherein the database operation comprises at least one of a triggered action, a referential integrity check, an index maintenance, a materialized query maintenance, a pre-computed aggregate update.

* * * * *